US012353919B2

(12) United States Patent
Esch et al.

(10) Patent No.: US 12,353,919 B2
(45) Date of Patent: Jul. 8, 2025

(54) TASK EXECUTION OPTIMIZATION TO REDUCE COMPUTING OR ENERGY RESOURCE USE

(71) Applicant: SAP SE, Walldorf (DE)

(72) Inventors: Jan-Philipp Esch, Walldorf (DE); Alexander Mandel, Bruchsal (DE); Patrick Mueller, Mannheim (DE); Henri Kohlberg, Sandhausen (DE)

(73) Assignee: SAP SE, Walldorf (DE)

( * ) Notice: Subject to any disclaimer, the term of this patent is extended or adjusted under 35 U.S.C. 154(b) by 467 days.

(21) Appl. No.: 17/962,424

(22) Filed: Oct. 7, 2022

(65) Prior Publication Data

US 2024/0118931 A1  Apr. 11, 2024

(51) Int. Cl.
*G06F 9/50* (2006.01)

(52) U.S. Cl.
CPC .......... *G06F 9/5038* (2013.01); *G06F 9/5044* (2013.01)

(58) Field of Classification Search
CPC . G06F 9/5038; G06F 9/5044; G06Q 10/0633; G06Q 10/0631
See application file for complete search history.

(56) References Cited

U.S. PATENT DOCUMENTS

| | | | | |
|---|---|---|---|---|
| 2019/0272467 A1* | 9/2019 | Kearney | ............... | G06N 3/006 |
| 2022/0129306 A1* | 4/2022 | Wang | .................... | G06F 9/5038 |
| 2023/0102209 A1* | 3/2023 | Cella | ..................... | G06Q 10/08 |
| | | | | 707/688 |
| 2023/0161629 A1* | 5/2023 | Sajja | .................... | G06F 9/4881 |
| | | | | 718/104 |
| 2023/0169077 A1* | 6/2023 | Zhang | ................ | G06F 11/3419 |
| | | | | 707/718 |
| 2024/0004723 A1* | 1/2024 | Jiang | .................... | G06F 9/5072 |

* cited by examiner

*Primary Examiner* — Brian W Wathen
(74) *Attorney, Agent, or Firm* — Klarquist Sparkman, LLP

(57) ABSTRACT

Techniques and solutions are provided for generating allocation tasks for a plurality of tasks requesting one or more instances of an element, the element being associated with a plurality of allocation units. At least one allocation unit is an aggregation unit that comprises multiple instances of the element. Certain disclosed techniques allow for a combination of types of allocation tasks, such as an allocation task that directly allocates one or more instances of an allocation unit to a task, or an allocation task that has subtasks of withdrawing one or more instances of an aggregation unit and then distributing element instances of the aggregation unit or units among a plurality of tasks. Another technique determines whether a multiple of a given aggregation unit can exactly satisfy multiple tasks of the plurality of tasks. Another aspect provides for splitting tasks into groups to allow for more efficient allocation.

20 Claims, 22 Drawing Sheets

720

| Order | Quantity | 2-Step? | WithdrawalQuantAltUAoM | WithdrawalQuantBaseUoM |
|---|---|---|---|---|
| 1 | 5 EA | YES | 1 PAL | 15 EA |
| 2 | 4 EA | YES | | |
| 3 | 3 EA | YES | | |
| 4 | 2 EA | YES | | |
| 5 | 1 EA | YES | | |
| Total | 15 EA | | | |

750

| Order | Quantity | 2-Step? | WithdrawalQuantAltUAoM | WithdrawalQuantBaseUoM |
|---|---|---|---|---|
| 1 | 5 EA | NO | 2 BOX | 10 EA |
| 2 | 4 EA | NO | 4 EA | 4 EA |
| 3 | 3 EA | YES | | |
| 4 | 1 EA | YES | | |
| 5 | 1 EA | YES | | |
| Total | 14 EA | | | |

770

| Order | Quantity | 2-Step? | WithdrawalQuantAltUAoM | WithdrawalQuantBaseUoM |
|---|---|---|---|---|
| 1 | 2 EA | NO | 10 EA | 10 EA |
| 2 | 2 EA | NO | | |
| 3 | 2 EA | NO | | |
| 4 | 2 EA | NO | | |
| 5 | 2 EA | NO | | |
| Total | 10 EA | | | |

| Element | New Element | 0 | 1 | 2 | 3 | 4 | 5 | 6 | 7 | 8 | 9 | 10 |
|---|---|---|---|---|---|---|---|---|---|---|---|---|
| 0 |   | X |   |   |   |   |   |   |   |   |   |   |
| 1 | 2 | C |   |   |   |   |   |   |   |   |   |   |
| 2 | 3 | C |   |   |   |   |   |   |   |   |   |   |
| 3 | 4 | C |   |   |   |   |   |   |   |   |   |   |
| 4 | 9 | C |   |   |   |   |   |   |   |   |   |   |
| 5 | 4 | C |   |   |   |   |   |   |   |   |   |   |

1210

| Element | New Element | 0 | 1 | 2 | 3 | 4 | 5 | 6 | 7 | 8 | 9 | 10 |
|---|---|---|---|---|---|---|---|---|---|---|---|---|
| 0 |   | X |   |   |   |   |   |   |   |   |   |   |
| 1 | 2 | C |   | X |   |   |   |   |   |   |   |   |
| 2 | 3 | C |   | C |   |   |   |   |   |   |   |   |
| 3 | 4 | C |   | C |   |   |   |   |   |   |   |   |
| 4 | 9 | C |   | C |   |   |   |   |   |   |   |   |
| 5 | 4 | C |   | C |   |   |   |   |   |   |   |   |

1220

| Element | New Element | 0 | 1 | 2 | 3 | 4 | 5 | 6 | 7 | 8 | 9 | 10 |
|---|---|---|---|---|---|---|---|---|---|---|---|---|
| 0 |   | X |   |   |   |   |   |   |   |   |   |   |
| 1 | 2 | C |   | X |   |   |   |   |   |   |   |   |
| 2 | 3 | C |   | C | X |   | X |   |   |   |   |   |
| 3 | 4 | C |   | C | C |   | C |   |   |   |   |   |
| 4 | 9 | C |   | C | C |   | C |   |   |   |   |   |
| 5 | 4 | C |   | C | C |   | C |   |   |   |   |   |

1240

| Element | New Element | 0 | 1 | 2 | 3 | 4 | 5 | 6 | 7 | 8 | 9 | 10 |
|---|---|---|---|---|---|---|---|---|---|---|---|---|
| 0 |   | X |   |   |   |   |   |   |   |   |   |   |
| 1 | 2 | C |   | X |   |   |   |   |   |   |   |   |
| 2 | 3 | C |   | C | X |   | X |   |   |   |   |   |
| 3 | 4 | C |   | C | C | X | C | X | X |   | X |   |
| 4 | 9 | C |   | C | C | C | C | C | C |   | X |   |
| 5 | 4 | C |   | C | C | X | C | X | X | C | X |   |

FIG. 12

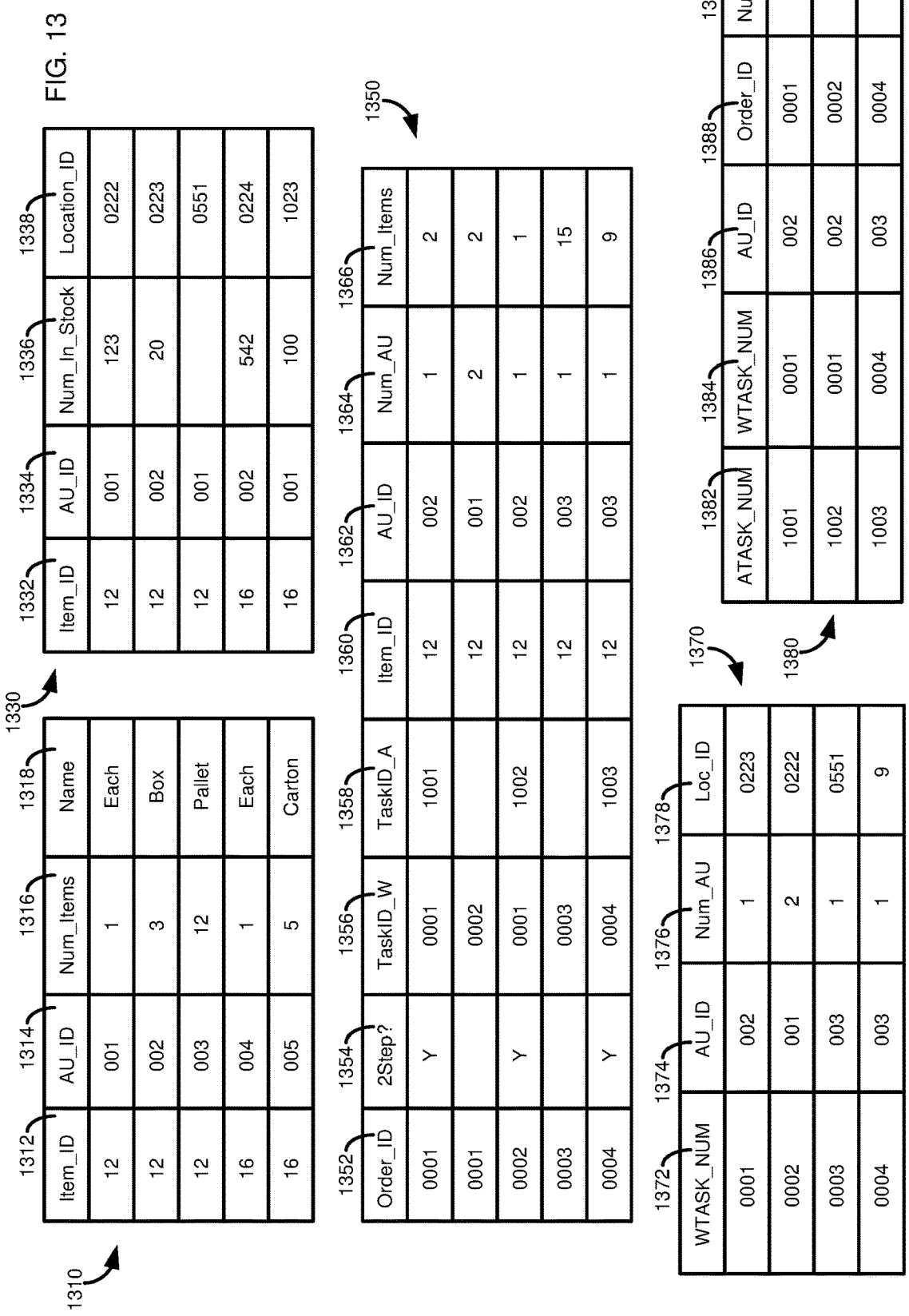

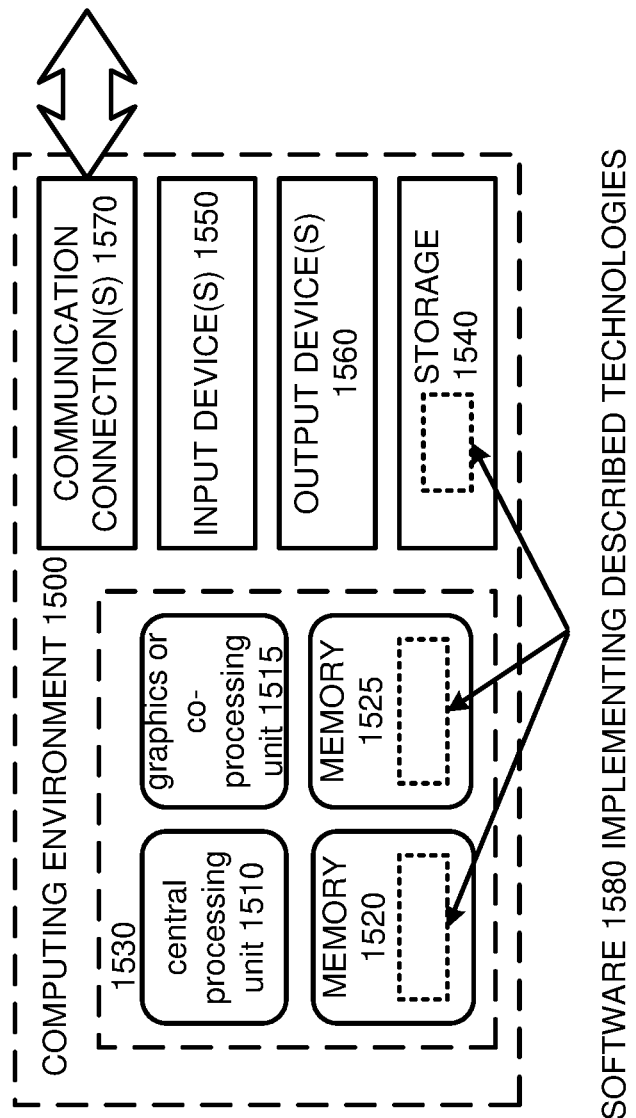

TASK EXECUTION OPTIMIZATION TO REDUCE COMPUTING OR ENERGY RESOURCE USE

FIELD

The present disclosure generally relates to optimizing steps for task execution. Particular implementations provide for optimizing tasks as one-step or two-step processes taking to account allocation units that may be available for allocation elements.

BACKGROUND

Many computing tasks, as well as analog world processes, can be carried out in a number of ways. However, the ways in which a task or process can be conducted can vary substantially in both execution steps and execution cost, even if they provide the same end result. As an example, a computing task may involving data having units of differing size, where it may be desirable to reduce a number of process steps to complete multiples requests for data minimizing a number of input/output (I/O) operations, including where data might be available in an uncompressed state and may also be available at one or more levels of compression.

In an analog world process, multiple requests may be received for different quantities of a particular item, where the item can be stored as collections of different quantities—such as being available in a pallet quantity, as multiple units (or "eaches") in a carton or box, or as discrete caches. Fulfillment of these requests can be resource intensive in a variety of ways. Execution of analog world tasks is still often determined by a computing process, and where task orders may be issued to accomplish task execution. A less optimized, or unoptimized, fulfillment plan may result in the generation of unnecessary task requests, which wastes computing resources such as processor cycles, memory, and persistent storage, in generating, storing, and monitoring elements of the fulfilment plan, as well as energy resources.

Resources are also unnecessarily expended during analog world execution of task requests associated with a fulfillment plan generated by a computing process. For example, assume that robots or other machinery are used to gather items from one or more physical locations for shipment as part of item requests. Having a robot perform more tasks, or more resource-intensive tasks, makes the robot unavailable for longer period of time, as well as "wasting" resources of the robot, including battery power and computing resources.

For at least the reasons discussed above, room for improvement exists in developing fulfillment plans for computer-mediated processes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for generating allocation tasks for a plurality of tasks requesting one or more instances of an element, the element being associated with a plurality of allocation units. At least one allocation unit is an aggregation unit that comprises multiple instances of the element. Certain disclosed techniques allow for a combination of types of allocation tasks, such as an allocation task that directly allocates one or more instances of an allocation unit to a task, or an allocation task that has subtasks of withdrawing one or more instances of an aggregation unit and then distributing element instances of the aggregation unit or units among a plurality of tasks. Another technique determines whether a multiple of a given aggregation unit can exactly satisfy multiple tasks of the plurality of tasks. Another aspect provides for splitting tasks into groups to allow for more efficient allocation.

In one aspect, the present disclosure provides a process for defining allocation tasks for a plurality of tasks, where some tasks of the plurality of tasks are satisfied by a direct allocation task and other tasks are satisfied by distributing element instances from an aggregation unit between a plurality of tasks.

A request is received that includes identifiers for each of a first plurality of tasks. Each task of the first plurality of tasks identifies a number of element instances required for the respective task. A plurality of allocation units are defined for the element. The plurality of allocation units include at least one aggregation unit, wherein an aggregation unit includes a defined quantity of a plurality of element instances.

A total quantity of element instances comprised within the first plurality of tasks is determined. It is determined that at least a first task of the plurality of tasks and at least a second task of the plurality of tasks have a combined number of element instances that is equal to a number of element instances in a first aggregation unit defined for the element or in a multiple of the first aggregation unit. A first allocation task is defined. The first allocation task includes (1) a first allocation subtask retrieving an instance of the first aggregation unit, or multiple instances of the first aggregation unit, and (2) a second allocation subtask distributing elements of the first aggregation unit, or of the multiple instances thereof, to the at least a first task and the at least a second task. A second allocation task is defined. The second allocation task directly allocates one of more instances of an allocation unit of the plurality of allocation units to at least a third task of the first plurality of tasks.

In another aspect, the present disclosure provides a process for optimizing allocation tasks by dividing a set of tasks into multiple groups, such as withdrawal groups. A request is received that includes identifiers for each of a first plurality of tasks. Each task of the first plurality of tasks identifies a number of element instances required for the respective task. A plurality of allocation units are defined for the element. The plurality of allocation units include at least one aggregation unit, where an aggregation unit includes a defined quantity of a plurality of element instances.

A total quantity of element instances included within the first plurality of tasks is determined. It is determined that a second plurality of tasks selected from the first plurality of tasks includes a number of elements instances equal to a number of element instances in the first aggregation unit or a multiple of the first aggregation unit. It is determined that the second plurality of tasks is less than the first plurality of tasks.

A third plurality of tasks are defined that are tasks of the first plurality of tasks not included in the second plurality of tasks. It is determined whether the third plurality of tasks are satisfiable using a second aggregation unit, where the second aggregation unit has a number of element instances different than the first aggregation unit, or a multiple of the second aggregation unit.

In a further aspect, the present disclosure provides a process for determining whether a sum can be achieved using a given set of values, where the process produces a data structure that is used to analyze multiples of a given step size. For example, the data structure can be used to determine whether at least a portion of orders in a wave can be satisfied by different multiples of an aggregation unit.

A plurality of values are received, the plurality of values having an order. A step size is defined. A first sum to achieve using value of the plurality of values as a first multiple of the step size is defined. A subsum value is set to zero. A current value is set to a first value of the plurality of values. A data structure is generated by, for each value of the plurality of values, until the subsum value equals the first sum to achieve, performing various operations.

The operations include determining whether the subsum value is equal to the current value or is produced by adding the current value to one or more of a set of zero or more prior values. When the subsum is equal to the current value or is produced by adding the current value to one or more of a set of zero or more prior values: (1) the current value is associated with a first value indicating that the subsum is producible using the current value; and (2) values of the plurality of orders occurring after the current value are associated with a second value indicating that the subsum is producible using a value of the plurality of values earlier in the order. The current value is added to the set of zero or more prior values. The current value is set to a value of the plurality of values next occurring in the order. When the subsum value is less than the first sum to achieve, the subsum value is incremented by one.

Multiple values of the plurality of values are determined whose sum is the same as the first sum to achieve using the data structure. A second sum to achieve is defined as a second multiple of the step size, where the second multiple is smaller than the first multiple. It is determined whether the second sum to achieve can be achieved using values of the plurality of values using the data structure.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 7 illustrates how orders in a set of allocation requests can be tracked in terms of a quantity of an allocation element in an allocation request and a technique to be used in fulfilling the allocation request, as well as amounts of one or more allocations units to be withdrawn from a storage in fulfilling the set of allocation requests.

FIG. 12 illustrates how a data structure can be used to track sums and subsums of the sum that can be achieved using a set of elements.

FIG. 13 illustrates data structures, such as database tables, that can be used in tracking allocation requests and allocation tasks according to disclosed techniques.

FIG. 15 is a diagram of an example computing system in which some described embodiments can be implemented.

DETAILED DESCRIPTION

Example 1—Overview

Figure 1:
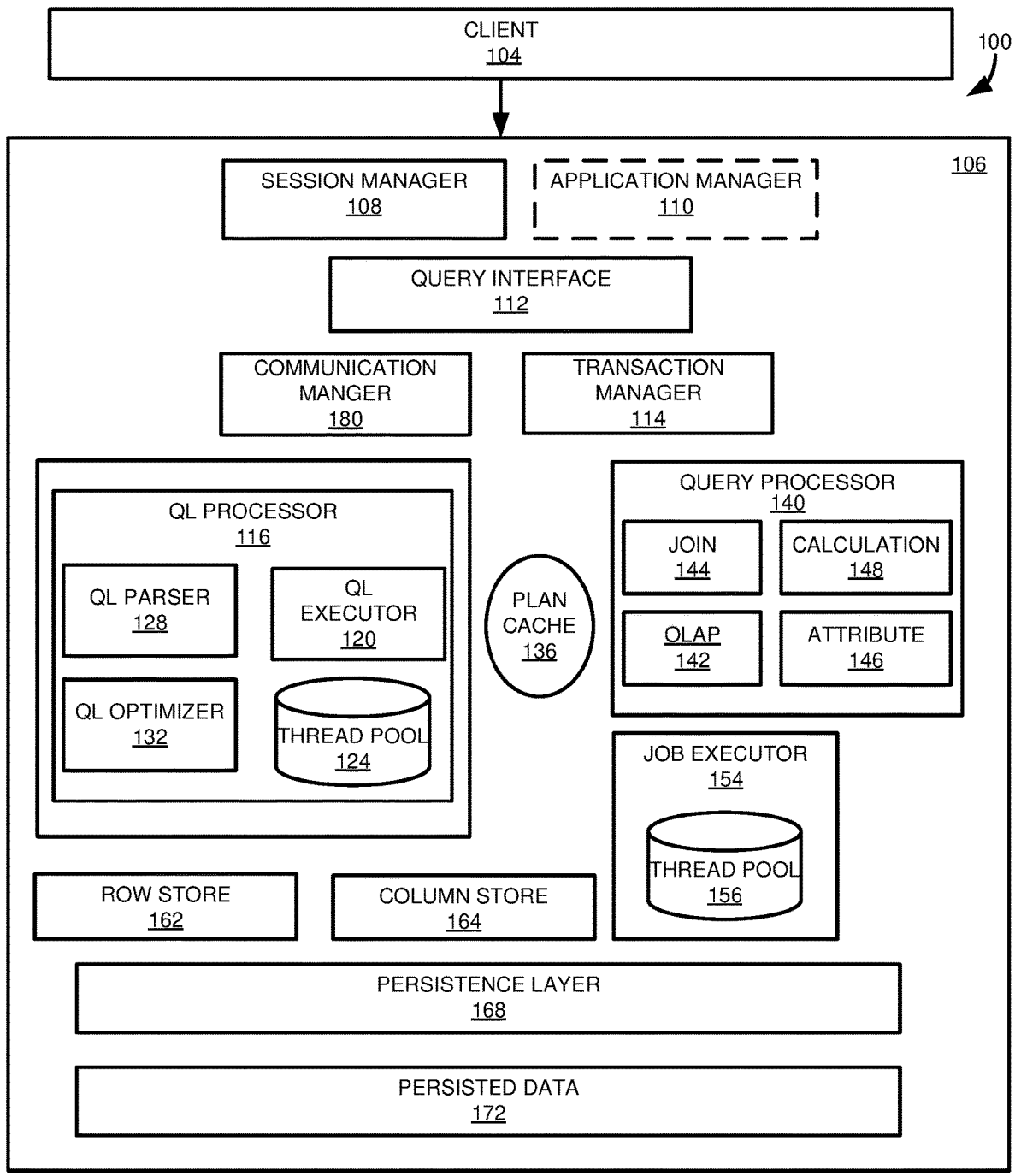
FIG. 1 is a diagram of an example database environment in which disclosed techniques can be implemented.

Many computing tasks, as well as analog world processes, can be carried out in a number of ways. However, the ways in which a task or process can be conducted can vary substantially in both execution steps and execution cost, even if they provide the same end result. As an example, a computing task may involving data having units of differing size, where it may be desirable to reduce a number of process steps to complete multiples requests for data minimizing a number of input/output (I/O) operations, including where data might be available in an uncompressed state and may also be available at one or more levels of compression.

In an analog world process, multiple requests may be received for different quantities of a particular item, where the item can be stored as collections of different quantities—such as being available in a pallet quantity, as multiple units (or "eaches") in a carton or box, or as discrete caches. Fulfillment of these requests can be resource intensive in a variety of ways. Execution of analog world tasks is still often determined by a computing process, and where task orders may be issued to accomplish task execution. A less optimized, or unoptimized, fulfillment plan may result in the generation of unnecessary task requests, which wastes computing resources such as processor cycles, memory, and persistent storage, in generating, storing, and monitoring elements of the fulfilment plan.

Resources are also unnecessarily expended during analog world execution of task requests associated with a fulfillment plan generated by a computing process. For example, assume that robots are used to gather items from one or more physical locations for shipment as part of item requests. Having a robot perform more tasks, or more resource-intensive tasks, make the robot unavailable for longer period of time, as well as "wasting" resources of the robot, including battery power and computing resources.

For at least the reasons discussed above, room for improvement exists in developing fulfillment plans for computer-mediated processes.

Innovations of the present disclosure are generally described in conjunction with an order-fulfillment scenario, which is believed to provide an easily understandable example of how the disclosed innovations can be used, and the practical and technical benefits of doing so. However, it should be appreciated that the disclosed techniques can be advantageously used in a variety of scenarios, including data retrieval, data storge, and data transmission.

In an allocation request fulfillment scenario, assume that one or more allocation requests, and typically a plurality of allocation requests, are received. Allocation requests are often processed in "waves," where a wave can represent a period of activity to fulfill allocation requests with respect to a particular event, such as a particular shipping or transmission event.

In the particular example of order fulfilment, at one or more times during a time period, such as a day, trucks might receive items associated with orders at a warehouse location to start the orders in a delivery process. Complex computing applications can help manage this overall process, such as queuing orders for fulfilment, generating tasks that can be executed to retrieve and package items that are included in order, and assigning an order to a particular transportation resource (such as a truck), where the assignment of an order to a transportation resource can take into account factors such as destinations serviced by the transportation resource, delivery windows that can be met using the transportation resource, and available space in the transportation resource. "Wave picking" refers to a process of fulfilling orders on a wave-by-wave basis, where typically a wave includes set of instructions for managing the wave, including tasks needed for fulfilling orders in the wave.

Allocation requests, such as orders, can be filled in a number of ways. In some cases, allocation requests can be directly fulfilled from a single storage location, such as a particular location in a particular warehouse or a particular storage location of a computing system, such as particular persistent storage device. At least some allocation elements, such as items in an order, that might be included in an allocation request can be available in units having different quantities. For example, an item might be available as individual units, or "caches," a box or carton that includes a first plurality of caches, and a pallet that includes a second plurality of caches, where often a pallet includes multiple smaller aggregation units (such as boxes/cartons). A direct allocation task can be issued to retrieve the appropriate number of allocation elements for a given allocation request in a given wave. However, this approach can be suboptimal in some circumstances, as it may be more efficient to make fewer withdrawal tasks from a main storage location and instead retrieve a larger-quantity unit from main storage and then distribute elements of that larger-quantity unit among multiple allocation requests, which can also be referred to as "deconsolidation."

The process of fulfilling a request for a particular allocation element for a particular allocation request can be referred to as "two-step allocation" (or, in the context of order fulfilment, two-step picking) since it involves two steps—withdrawing an amount of the allocation element from primary storage and transporting the amount to an intermediate location, and then allocating allocation elements from the withdrawn amount among individual allocation requests. As will be seen during the description of various examples of the disclosed techniques, direct allocation can be more efficient in some circumstances, while two-step allocation can be more efficient in other circumstances.

Taking the specific example of order fulfilment, computer-implemented warehouse management processes typically only allow a choice, often manually set by a user, on whether two-step picking will be used or direct picking will be used. While the selection of one technique for use in a warehouse may be overall more efficient than the selection of another technique, in many cases the use of a single technique is still suboptimal as opposed to being able to select a fulfillment technique on a more granular basis, such as for particular waves or for particular orders within a wave.

For any given set of allocation requests, there may be multiple ways of fulfilling the allocation requests using two-step allocation. For example, fulfillment of a particular group of orders in a wave could be achieved using different combinations of pallets, units, and eaches. Some combinations may be more efficient than others.

Because the number and types of allocation requests (such as in the number of allocation elements requested by a particular allocation request) in a wave can change, and because the availability of different aggregation units of different allocation elements can vary between allocation elements, and vary over time for any given allocation element, it can be difficult to develop fixed rules for selecting between direct allocation and two-step allocation, or for optimizing a two-step allocation process. However, optimizing a two-step allocation process can be computationally expensive and time consuming, including being so expensive and time consuming that it cannot be practically used in real-world applications.

The present disclosure provides a variety of techniques that can be used to address issues noted above. These techniques can be, but need not be, used together. Generally, the present disclosure provides (1) for selecting, including dynamically, between two-step allocation and direct allocation for particular allocation elements; (2) for optimizing a two-step allocation process; and (3) an algorithm that can be used to solve the "subset-sum" problem, including in a way that is computationally beneficial for the disclosed fulfillment scenarios, but which may find beneficial use in other computing processes (including data retrieval, storage, or transmission). These techniques, as well as additional beneficial innovations associated therewith, will be described in further detail as the specification proceeds.

Example 2—Example Database System Useable in Implementing Disclosed Innovations

Database systems commonly operate using online transaction processing (OLTP) workloads, which are typically transaction-oriented, or online analytical processing (OLAP) workloads, which typically involve data analysis. OLTP transactions are commonly used for core business functions, such as entering, manipulating, or retrieving operational data, and users typically expect transactions or queries to be completed quickly. For example, OLTP transactions can include operations such as INSERT, UPDATE, and DELETE, and comparatively simple queries. OLAP workloads typically involve queries used for enterprise resource planning and other types of business intelligence. OLAP workloads commonly perform few, if any, updates to database records, rather, they typically read and analyze past transactions, often in large numbers because OLAP processes can involve complex analysis of a large number of records.

FIG. 1 illustrates an example database environment 100. The database environment 100 can include a client 104. Although a single client 104 is shown, the client 104 can represent multiple clients. The client or clients 104 may be OLAP clients, OLTP clients, or a combination thereof.

The client 104 is in communication with a database server 106. Through various subcomponents, the database server 106 can process requests for database operations, such as requests to store, read, or manipulate data. A session manager component 108 can be responsible for managing connections between the client 104 and the database server 106, such as clients communicating with the database server using a database programming interface, such as Java Database Connectivity (JDBC), Open Database Connectivity (ODBC), or Database Shared Library (DBSL). Typically, the session manager 108 can simultaneously manage connections with multiple clients 104. The session manager 108 can carry out functions such as creating a new session for a client request, assigning a client request to an existing session, and authenticating access to the database server 106. For each session, the session manager 108 can maintain a context that stores a set of parameters related to the session, such as settings related to committing database transactions or the transaction isolation level (such as statement level isolation or transaction level isolation).

For other types of clients 104, such as web-based clients (such as a client using the HTTP protocol or a similar transport protocol), the client can interface with an application manager component 110. Although shown as a component of the database server 106, in other implementations, the application manager 110 can be located outside of, but in communication with, the database server 106. The application manager 110 can initiate new database sessions with the database server 106, and carry out other functions, in a similar manner to the session manager 108.

The application manager 110 can determine the type of application making a request for a database operation and mediate execution of the request at the database server 106, such as by invoking or executing procedure calls, generating query language statements, or converting data between formats useable by the client 104 and the database server 106. In particular examples, the application manager 110 receives requests for database operations from a client 104, but does not store information, such as state information, related to the requests.

Once a connection is established between the client 104 and the database server 106, including when established through the application manager 110, execution of client requests is usually carried out using a query language, such as the structured query language (SQL). In executing the request, the session manager 108 and application manager 110 may communicate with a query interface 112. The query interface 112 can be responsible for creating connections with appropriate execution components of the database server 106. The query interface 112 can also be responsible for determining whether a request is associated with a previously cached statement or a stored procedure, and calling the stored procedure or associating the previously cached statement with the request.

At least certain types of requests for database operations, such as statements in a query language to write data or manipulate data, can be associated with a transaction context. In at least some implementations, each new session can be assigned to a transaction. Transactions can be managed by a transaction manager component 114. The transaction manager component 114 can be responsible for operations such as coordinating transactions, managing transaction isolation, tracking running and closed transactions, and managing the commit or rollback of transactions. In carrying out these operations, the transaction manager 114 can communicate with other components of the database server 106.

The query interface 112 can communicate with a query language processor 116, such as a structured query language processor. For example, the query interface 112 may forward to the query language processor 116 query language statements or other database operation requests from the client 104. The query language processor 116 can include a query language executor 120, such as a SQL executor, which can include a thread pool 124. Some requests for database operations, or components thereof, can be executed directly by the query language processor 116. Other requests, or components thereof, can be forwarded by the query language processor 116 to another component of the database server 106. For example, transaction control statements (such as commit or rollback operations) can be forwarded by the query language processor 116 to the transaction manager 114. In at least some cases, the query language processor 116 is responsible for carrying out operations that retrieve or manipulate data (e.g., SELECT, UPDATE, DELETE). Other types of operations, such as queries, can be sent by the query language processor 116 to other components of the database server 106. The query interface 112, and the session manager 108, can maintain and manage context information associated with requests for database operation. In particular implementations, the query interface 112 can maintain and manage context information for requests received through the application manager 110.

When a connection is established between the client 104 and the database server 106 by the session manager 108 or the application manager 110, a client request, such as a query, can be assigned to a thread of the thread pool 124, such as using the query interface 112. In at least one implementation, a thread is associated with a context for executing a processing activity. The thread can be managed by an operating system of the database server 106, or by, or in combination with, another component of the database server. Typically, at any point, the thread pool 124 contains a plurality of threads. In at least some cases, the number of threads in the thread pool 124 can be dynamically adjusted, such in response to a level of activity at the database server 106. Each thread of the thread pool 124, in particular aspects, can be assigned to a plurality of different sessions.

When a query is received, the session manager 108 or the application manager 110 can determine whether an execution plan for the query already exists, such as in a plan cache 136. If a query execution plan exists, the cached execution plan can be retrieved and forwarded to the query language executor 120, such as using the query interface 112. For example, the query can be sent to an execution thread of the thread pool 124 determined by the session manager 108 or the application manager 110. In a particular example, the query plan is implemented as an abstract data type.

If the query is not associated with an existing execution plan, the query can be parsed using a query language parser 128. The query language parser 128 can, for example, check query language statements of the query to make sure they have correct syntax, and confirm that the statements are otherwise valid. For example, the query language parser 128 can check to see if tables and records recited in the query language statements are defined in the database server 106.

The query can also be optimized using a query language optimizer 132. The query language optimizer 132 can manipulate elements of the query language statement to allow the query to be processed more efficiently. For example, the query language optimizer 132 may perform operations such as unnesting queries or determining an optimized execution order for various operations in the query, such as operations within a statement. After optimization, an execution plan can be generated, or compiled, for the query. In at least some cases, the execution plan can be cached, such as in the plan cache 136, which can be retrieved (such as by the session manager 108 or the application manager 110) if the query is received again.

For the purposes of the present disclosure, one task that can be performed by the query language optimizer 132 is determining a location where a request for a database operation, or a portion thereof, should be performed. For instance, a complex query may be submitted that reads data from multiple data sources. At least one of the data sources may be a virtual table, and the request can be performed on an anchor node, such as a node represented by a computing system implementing the database environment 100, or another node, including a node that was dynamically created in response to a request for a database operation, another request for a database operation, or based on overall workload/performance of a database system that include one or more nodes (that is, if a workload exceeds a threshold, a non-anchor node can be instantiated).

Once a query execution plan has been generated or received, the query language executor 120 can oversee the execution of an execution plan for the query. For example, the query language executor 120 can invoke appropriate subcomponents of the database server 106.

In executing the query, the query language executor 120 can call a query processor 140, which can include one or more query processing engines. The query processing engines can include, for example, an OLAP engine 142, a join engine 144, an attribute engine 146, or a calculation engine 148. The OLAP engine 142 can, for example, apply rules to create an optimized execution plan for an OLAP query. The join engine 144 can be used to implement relational operators, typically for non-OLAP queries, such as join and aggregation operations. In a particular implementation, the attribute engine 146 can implement column data structures and access operations. For example, the attribute engine 146 can implement merge functions and query processing functions, such as scanning columns.

In certain situations, such as if the query involves complex or internally-parallelized operations or sub-operations, the query executor 120 can send operations or sub-operations of the query to a job executor component 154, which can include a thread pool 156. An execution plan for the query can include a plurality of plan operators. Each job execution thread of the job execution thread pool 156, in a particular implementation, can be assigned to an individual plan operator. The job executor component 154 can be used to execute at least a portion of the operators of the query in parallel. In some cases, plan operators can be further divided and parallelized, such as having operations concurrently access different parts of the same table. Using the job executor component 154 can increase the load on one or more processing units of the database server 106, but can improve execution time of the query.

The query processing engines of the query processor 140 can access data stored in the database server 106. Data can be stored in a row-wise format in a row store 162, or in a column-wise format in a column store 164. In at least some cases, data can be transformed between a row-wise format and a column-wise format. A particular operation carried out by the query processor 140 may access or manipulate data in the row store 162, the column store 164, or, at least for certain types of operations (such a join, merge, and subquery), both the row store 162 and the column store 164. In at least some aspects, the row store 162 and the column store 164 can be maintained in main memory.

A persistence layer 168 can be in communication with the row store 162 and the column store 164. The persistence layer 168 can be responsible for actions such as committing write transaction, storing redo log entries, rolling back transactions, and periodically writing data to storage to provided persisted data 172.

In executing a request for a database operation, such as a query or a transaction, the database server 106 may need to access information stored at another location, such as another database server. The database server 106 may include a communication manager 180 component to manage such communications. The communication manger 180 can also mediate communications between the database server 106 and the client 104 or the application manager 110, when the application manager is located outside of the database server.

In some cases, the database server 106 can be part of a distributed database system that includes multiple database servers. At least a portion of the database servers may include some or all of the components of the database server 106. The database servers of the database system can, in some cases, store multiple copies of data. For example, a table may be replicated at more than one database server. In addition, or alternatively, information in the database system can be distributed between multiple servers. For example, a first database server may hold a copy of a first table and a second database server can hold a copy of a second table. In yet further implementations, information can be partitioned between database servers. For example, a first database server may hold a first portion of a first table and a second database server may hold a second portion of the first table.

In carrying out requests for database operations, the database server 106 may need to access other database servers, or other information sources, within the database system. The communication manager 180 can be used to mediate such communications. For example, the communication manager 180 can receive and route requests for information from components of the database server 106 (or from another database server) and receive and route replies.

Figure 2:
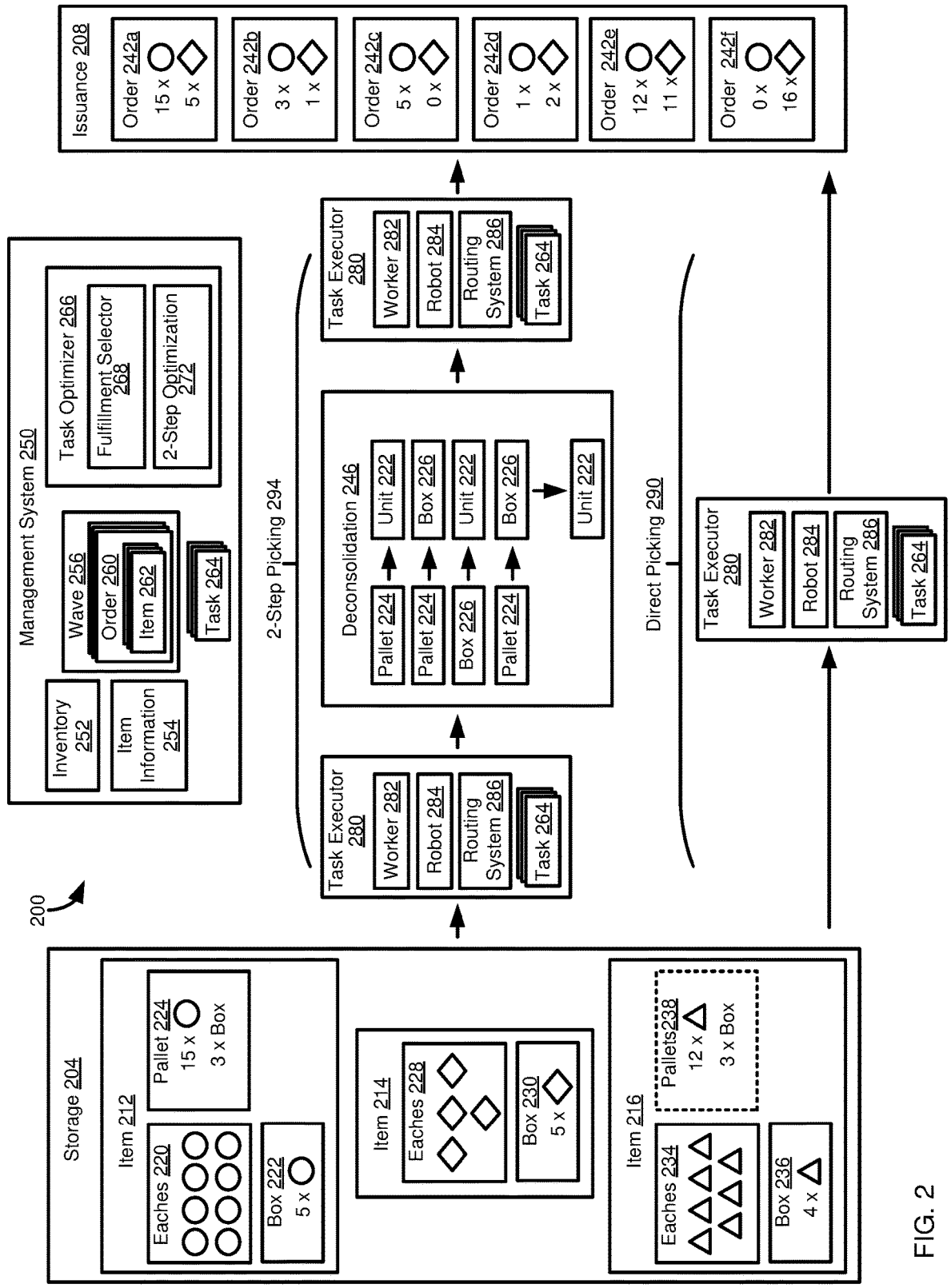
FIG. 2 is a diagram illustrating how allocation requests can be fulfilled using direct allocation or two-step allocation, and a computer-implement management system that can be used to optimize a fulfilment process for a set of allocation requests.

Example 3—Example Allocation Environment Including Computer-Implemented Management System for Optimizing Allocation Tasks FIG. 2 illustrates an overall environment 200 for order fulfillment, which, as described in Example 1, is used as the primary illustrative example for describing the innovative technologies of the present disclosure. The environment 200 includes both computer-implemented elements and analog-world elements.

Generally, the environment 200 illustrates the movement of items from storage 204 to an issuance location 208, where the issuance location can represent a location at which items in a particular order are combined, and where the combined items for an order are packaged and received for shipment. As for the storage 204, it is shown as including a plurality of items 212, 214, 216, where a given item can be stored in one or more allocation units, where an unit includes a fixed amount of one or more "elements" of the given item. An allocation unit that includes multiple elements is referred to as an "aggregation unit."

Taking item 212, item 212 is available as individual elements 220, or "caches," as well as boxes (or cartons) 222 that include 5 caches (elements) of the item, and a pallet 224 that includes 3 boxes 222 or 15 caches. On the other hand, item 214 only is available as caches 228 and boxes 230.

Whether a given unit of an item is "defined" can be a different question than whether such a unit is actually available at a given time. To illustrate, item 216 is shown as having units of caches 234, boxes 236, and pallets 238. However, the box for the pallets 238 is shown in dashed lines, which indicates that a "pallet" is defined for the item 216, but is currently not available (which could mean that no pallets are in stock, or that pallets are in stock but are reserved for other uses/not available for a process that is implemented in the environment 200).

The issuance location 208 is shown as including a plurality of orders 242, shown as order 242a-242f. In this example, the orders 242 are shown as having zero or more elements of item 212 or item 214. It should be appreciated that the number of orders and the number and type of items in an order can vary. As will be further discussed, the total number of a given item in all of the orders 242, or in a defined subgroup of the orders, can be used to help determine how the individual orders 242 should be fulfilled. As described above, it can be beneficial in some cases to use a two-step picking process where a single withdrawal step is used as part of a process for fulfilling multiple orders 242.

Continuing with the topic of two-step picking, the environment 200 includes a deconsolidation area 246. In general, the deconsolidation area 246 is used to distribute elements from aggregation units to multiple orders 242. As shown, and using item 212 as an example, pallets 224 can be deconsolidated into eaches 220 or boxes 222 as a unit to be provided to orders 242. Or, pallets 224 can first be deconsolidated into boxes 222, and one or more of the boxes can be further deconsolidated into eaches 220. That is, if a pallet 224 consists of eaches, then a single deconsolidation step can be used to obtain eaches from the pallet. However, if the desired unit is eaches, and the pallet consists of boxes, two deconsolidation steps are used.

The operation of the environment 200 can be mediated using computer-implemented techniques using a management system 250, where the management system is implemented on a computing system that includes one or more hardware processor and one or more memories coupled to the one or more hardware processors. The management system 250 includes program functionality for accessing an inventory 252, where the inventory can be maintained in a relational database system, such as the database system described in conjunction with FIG. 1 (which can be also be used in implementing other components of the management system 250). The inventory 252 can include information about available stocks of items in the storage 204.

The management system 250 can also include item information 254. Item information 254 can include information such as allocation units in which items are available, such as indicating whether a given item is available in one or more of pallets, boxes, or eaches. The item information 254 can provide other information, such as whether a particular item, or a particular allocation unit of a particular item, should be analyzed using one or more disclosed techniques. For example, some users of the management system 250 may want to specify that certain items should always be processed using direct picking or always be processed using two-step picking, or that pallets, even if defined and in inventory, should not be used for optimizing two-step picking.

Wave information 256 can also be accessed and managed by the management system 250. For example, the wave information 256 can store information about orders 260 in the wave, where in turn the order information can identify items 262 in the order. In a particular example, a wave information 256 is implemented as one or more database tables, where a table of the one or more tables references one or more tables that store order information 260, which in turn can be used to access one or more tables that store item information 254.

The management system 250 generates tasks 264 based on the wave information 256. The tasks 264 can be implemented to fulfill the orders 260 in a wave, as will be further described. As discussed, the present disclosure optimizes the generation of tasks 264, including so that fewer tasks are generated for a given wave or tasks can be performed with less resource expenditure than when the techniques are not used. Consistently, as used herein, "optimized" refers to task generation where the disclosed techniques provide some benefit as compared to task generation when disclosed techniques are not used. "Optimization" does not require any particular level of "optimization," such as requiring the generation of a task 264 or set of tasks that is "optimal" in an absolute sense.

Task optimization of the present disclosure can use one or more features of a task optimizer 266. A task optimizer 266 can include fulfillment selector functionality 268. The fulfillment selector 268 analyze wave information 256 to determine whether one or more orders 260 (such as the orders 242) of the wave should be fulfilled using direct selection or two-step picking. The task optimizer 266 can also include two-step optimization functionality 272. The two-step optimization functionality 272 can determine a most efficient way (or a way that satisfies particular criteria, which criteria can at least in part be an efficiency, according to some measure) to carry out a two-step picking process.

Note that any given process, or particular implementation of the present disclosure, can include one or both of the fulfillment selector functionality 268 or the two-step optimization functionality 272. While it can be beneficial to use both techniques in combination, the use of the techniques separately also provides benefits. For example, two-step optimization can be beneficial even if two-step picking is manually specified or is specified through a process other than the fulfillment selector functionality 268. Similarly, the ability to use both direct picking and two-step picking in a given warehouse, and more particularly for a given wave 256 being processed at the warehouse, can be beneficial, regardless of whether two-step picking is further optimized.

The tasks 264 direct how a given item of a given order 242 (260) should be processed, and such processing can be specified by a single task or multiple tasks. Disregarding other considerations, generally it is beneficial to minimize a number of tasks 264 needed for an order 242. That is, the tasks 264 typically have a software representation, such as a computing artifact or object, such as an instance of an abstract or composite data type, or entries in one or more database tables. Thus, having fewer tasks saves computer memory and storage, as well as the processing to generate and manage tasks. Further, task execution requires time and resources, whether that is performed by a human, a robot, or a routing system that is at least partly executed.

Consistent with the discussion above, a task executor 280 can be used to execute a single direct picking operation 290 or one or both of multiple, two-step picking operations 294. A task executor 280 can be a worker (that is, a human worker) 282, a robot 284, or a routing system 286. In some cases, a single task 264 can be executed using a combination of executors 280, including executors of different types. A task 264 executed by multiple executors 280 can include a plurality of subtasks or be implemented/represented as a collection of tasks. As an example, a task 264 to retrieve an item 212 from storage may involve a subtask to remove an item from storage 204 that is carried out by a robot 284 or an automated routing system 286 (for example, automated warehouse shelving, automated conveyor systems), but transportation, packaging, or other task elements may be performed by a worker 282 as the task executor 280. Similarly, in the case of two-step picking operations 294, a single operation can include a collection or subtasks or operations that may be performed by the same task executor 280 or by different task executors, including task executors of different types. Since two-step picking operations 294 by definition include two steps, each step can be implemented in similar manner as the single, overall task 264 of the direct picking operation 290, including where the first two-step picking operation and the second two-step picking operation are represented by different tasks 264, a task can be a collection or tasks or can include subtasks, and where the first and second two-step picking steps can be performed by the same task executor 280, by different task executors of the same type, or by different task executors of differing types.

Example 4—Example Order Fulfilment Optimization Technique

Figure 3:
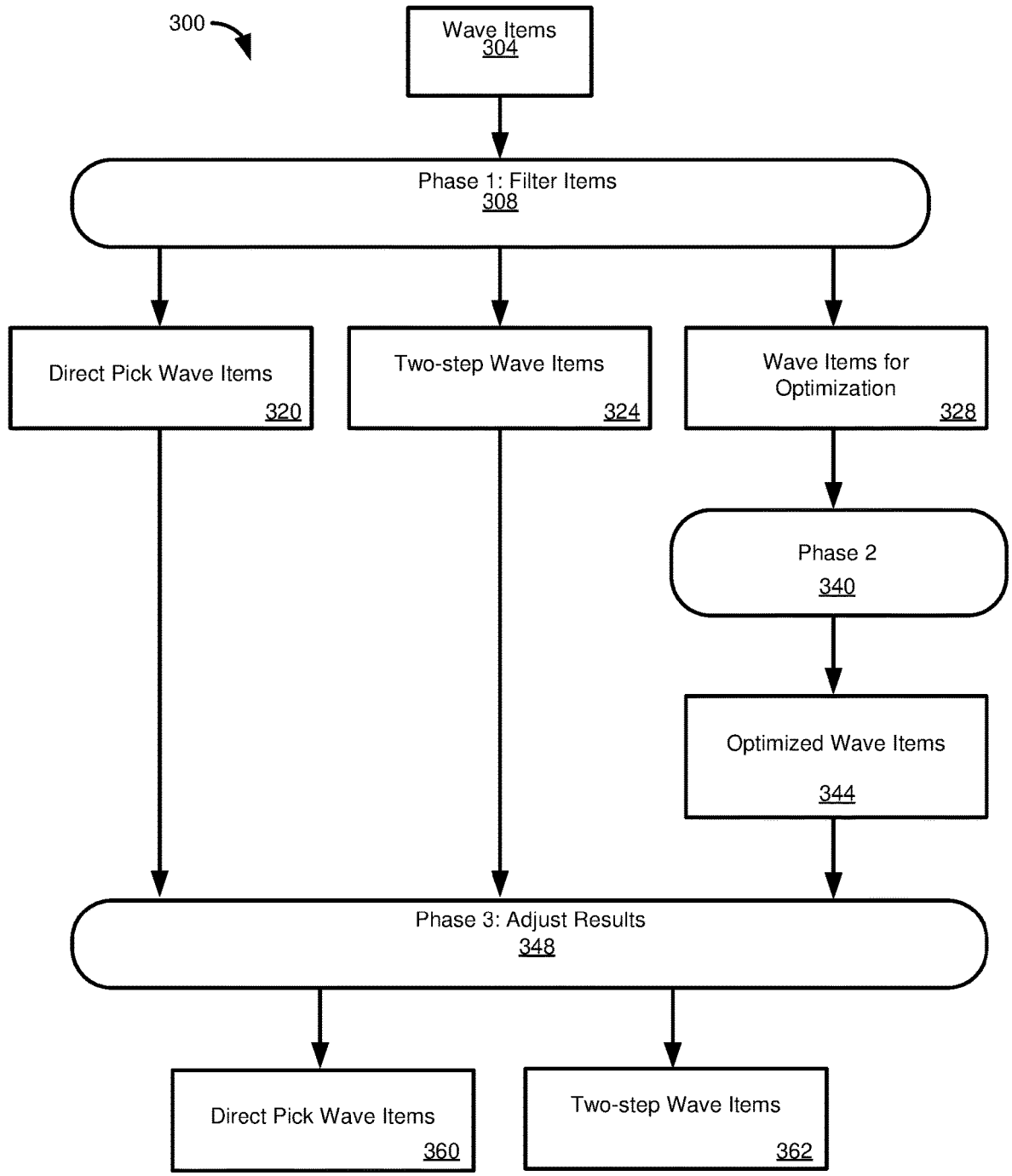
FIGS. 3-6 are flowcharts of a method for optimizing allocation request fulfilment according to the present disclosure.

FIG. 3 is a flowchart of a process 300 according to an embodiment of the present disclosure. The process 300 can represent functionality of the management system 250 of FIG. 2, more particularly functionality of the task optimizer 266.

A list of wave items 304 is received and is provided as input to a first phase 308 of the process 300. The list of wave items 304 includes information such as an overall quantity particular items in the collection of wave items in a wave as well as individual quantities of the item needed for particular wave items (orders). The list of wave items 304 can include information such as allocation units in which a given item is available and any particular restrictions or other processing instructions that have been set for an item, although in some cases this information is not included in the list of wave items, but is accessible to the process 300 (such as by using an item identifier to access information about the item in the inventory 252 or the item information 254).

Figure 4:
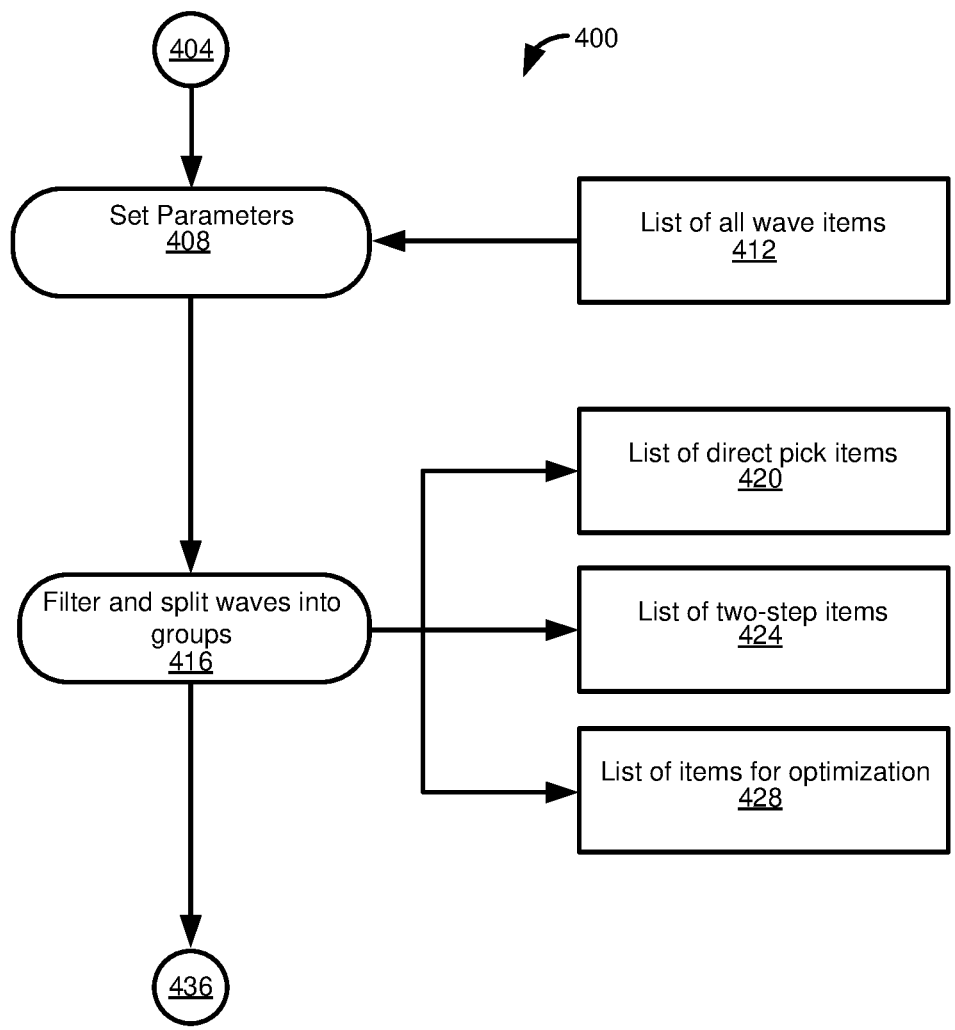

The first phase 308 of the process 300 involves sorting or filtering items of the wave items 304, including sorting items into categories of (1) items to be picked via direct picking; (2) items to be picked via two-step picking; and (3) wave items that are to be optimized by analyzing whether at least a portion of operations in the two-step picking processes can be replaced by direct picking processes, or direct picking processes can be replaced by two-step picking processes. A flowchart of a process 400 for the first phase 308 of the process is shown in FIG. 4.

Figure 5:
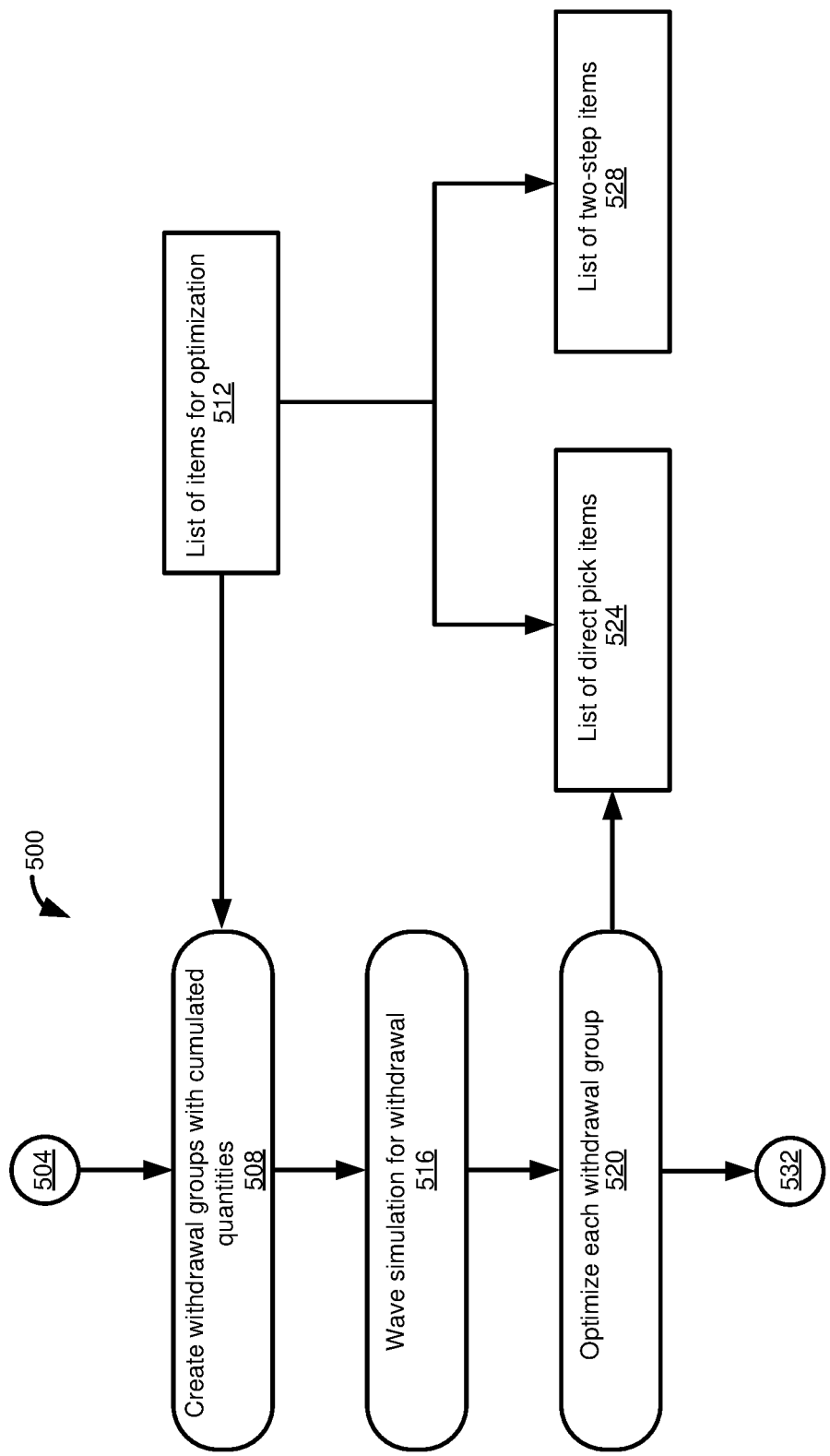

The process 400 begins at 404. Processing parameters are set at 408 using a list of wave items 412 as input. Setting processing parameters can include modifying default processing logic with any specific logic that may have been set by a particular user for a particular implementation of the process 400 (or the process 300). In particular, parameter setting at 404 can include determining that the process 400 should not execute (as well as a process 500, discussed below in conjunction with the description of FIG. 5), providing a list of items that are to be included in (or which should be excluded from) optimization, specifying particular allocation units (which can be overall or for particular items) of items should be included in (or excluded from) optimization. Parameter setting at 404 can provide a number of benefits. For example, if a computing system is under heavy load, or analog world resources are under heavy load (for example, a large number of orders means that task executors have many tasks/there are not enough task executors), the optimization process can be skipped. Excluding particular items or allocation units for particular items can be useful when a user has practical knowledge that such optimizations are not particularly useful, or may cause practical problems, such as in cases where a particular unit of a particular item "exists," but in practice such unit is not often present in a warehouse. Such filtering/parameter setting can both reduce processing time, and "improve" result quality.

The list of wave items (order) 408 is filtered at 416 using the parameters set at 408 and optionally other filtering criteria. That is, items and item quantities in the item list of wave items can be removed from consideration during the process 400. Another filter criteria can be excluding items which are specified in a single order of the wave. As discussed, benefits can be achieved by combining warehouse tasks such that a single task can be executed for multiple orders rather than having single tasks for each of multiple orders. In a similar manner, filtering at 416 can include removing items where combining item quantities from multiple orders does not allow a larger item unit to be picked from storage and then deconsolidated.

As an example, assume an item is available as eaches and in boxes of 5 eaches. If two orders for the item are present, one with one item and one with three items, the overall quantity is four, which is less than the box quantity. Therefore, the items of those two orders can be classified as direct pick operations. Disclosed techniques are typically used with whole number quantities. In these cases, wave items that have non-whole number quantities, or which would be subject to a conversion that would produce a result that is not a whole number, can be excluded from consideration.

The result of the filtering at 416 is wave items categorized, which are then categorized, or grouped, at 416 into groups of direct pick items 420, two-step pick items 424, and items 428 to be evaluated in an optimization/simulation process.

The process 400 then ends at 436, which can include returning to the process 300. As noted above, the output of the process 400 includes the items groups 420, 424, 428, which are represented in FIG. 3 as groups 320, 324, 328, respectively. With continued reference to FIG. 3, a withdrawal task simulation and optimization process is carried out at 340. The details of the process 340 are described in conjunction with the process 500 of FIG. 5.

The process 500 begins at 504. At 508, withdrawal groups are created using cumulative quantities determined from a list of input items for optimization 512, which can correspond to the list of input items 328 or the list of input items 428. "Withdrawal groups" refers to a set of wave items (orders) that are grouped together for a fulfilment process, at least as to a particular item common between the orders. For example, a two-step picking process can be used, where an aggregation unit is retrieved from storage and then deconsolidated, and then the items in the aggregation unit are then distributed to the wave items in the withdrawal group. A withdrawal group can be created for less than all wave items (order) in a wave, and multiple withdrawal groups can be created for an overall quantity of a particular item (allocation element) in the wave. Correspondingly, different options may exist for creating withdrawal groups for a given quantity of items/wave items in a wave, as will be further described.

Various rules for creating or prioritizing withdrawal groups can be defined. One such rule specifies that a withdrawal group is initially created for all wave items requesting a particular element, or "item." So, if a combination of wave items had a combined total of 16 eaches of a given item, the withdrawal group would be 16. It is then determined whether a combination of wave items can have their item sum be exactly satisfied by a multiple of a particular aggregation unit, such as a largest aggregation unit. If so, the items that can be satisfied by the largest aggregation unit can be included in a withdrawal group, and any remaining items can be put in another withdrawal group. If the wave items and their item sum cannot exactly be satisfied by the largest aggregation unit, it can then be determined if a smaller aggregation unit can exactly satisfy the wave items/item sum, and the process of splitting the withdrawal group/looking at smaller aggregation units can continue until all wave items are satisfied or no smaller aggregation units remain A similar process can take place for wave items and their associate item sum remaining in a second withdrawal group after determining that wave items in a first withdrawal group can be exactly satisfied by an aggregation unit.

For example, assume that an item is available as a pallet of 15 eaches, and that eight orders include the item, each order including two each of the item. The initial withdrawal group is thus 16 items. Since the total quantity needed for the orders is 16, and a pallet has 15 eaches, there is no combination of orders that is exactly satisfied by a pallet. At least certain processes would not consider that a pallet is useful, even though it could be used to satisfy some of the orders, since another withdrawal task would be needed to obtain the remaining each needed to fill all the orders in the withdrawal group. Assume further than the items also are available in boxes of 5 eaches. The initial withdrawal group is then analyzed, and it is determined that two boxes provide a total of 10 caches, which can exactly satisfy five of the eight orders. Those five orders form one withdrawal group, satisfied by the two boxes, and the remaining three orders form another withdrawal group. Thus, the technique can be considered as "splitting" an initial withdrawal group. For the remaining three orders, since a box cannot exactly satisfy any combination of orders in their withdrawal group, the process would continue to look at a smaller aggregation unit, if available, or stop if no smaller aggregation unit is available.

As described above, a reason for not implementing a withdrawal group for a whole quantity of orders/items that is not exactly satisfied by a combination of orders in the withdrawal group is because it would not lead to any efficiencies, since two warehouse withdrawal tasks would be required (withdrawing one pallet and withdrawing one each). On the other hand, splitting a withdrawal group to have a smaller withdrawal group be satisfied by a smaller aggregation unit can be beneficial, as it can still result in fewer tasks than direct picking of each order for the original withdrawal group.

However, in some cases direct pick tasks can be more or less 'costly" than two-step picking tasks, and so this differential cost can be considered when defining withdrawal groups, or other optimization techniques. Similarly, in some cases looking at orders as a combination of items, rather than looking at each item in isolation, may provide cost considerations that favor the creation of withdrawal tasks that would not be selected using the above-described logic. Additional details, and examples, of creating withdrawal groups are described in Examples 7 and 8.

A wave simulation process is executed at 516, where wave items and associated warehouse tasks are simulated. That is, creating "actual" wave items and warehouse tasks may be impractical in some cases because it would start actual warehouse processes, or would affect data associated with the warehouse, such as availability of task executors or inventory levels. Accordingly, the optimization process can use simulated computing constructs that at least generally correspond to "actual" computing constructs used in computer-implemented warehouse processes. Wave execution conditions determined as a result of the simulation/optimization at 516 can later be assigned to computing constructs used in actually executing the wave.

The withdrawal tasks are then optimized at 520, as will be further explained, including in Examples 7 and 8. Optimization can include determining whether particular withdrawal groups, or particular operations with respect to a withdrawal group, should be conducted by direct picking or two-step picking. The optimization at 520 produces a list of items 524 to be processed using direct picking and a list of items 528 to be processed using two-step picking, wherein in some cases a particular item (associated with one or more wave items) can be in both of the lists 524, 528 for a given wave, or even for a given withdrawal group. The method 500 can then end at 532.

Figure 6:
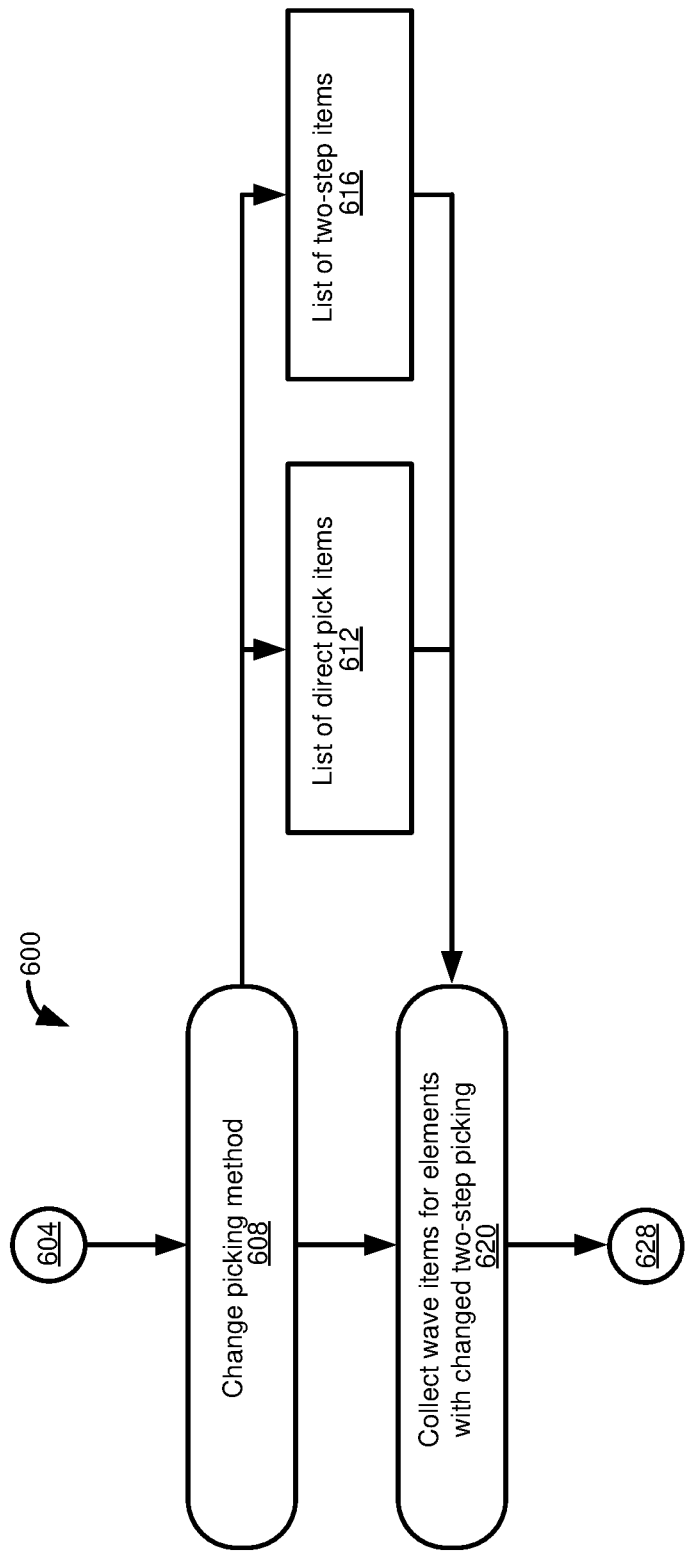

Returning to FIG. 3, the process 300 can continue, where an optimized list of wave items and their associated warehouse tasks 344 (corresponding at least in part to the list of items 524, 528) are optionally adjusted at 348. The adjustment at 348 is further described with respect to a process 600 illustrated in FIG. 6.

The process 600 begins at 604. At 608, changes to picking methods can optionally made, which results in a modified list 612 of direct pick items and a modified list 616 of two-step picking items. Changes to a picking method can be made for a number of reasons, such as excluding particular items or item quantities from two step-picking, or based on an overall wave workload that would result from a picking process. For example, if a deconsolidation area cannot handle a suggested amount of two-step picking operations, or a sufficient number of task-executors needed for two-step picking are not available, depending on the availability of stock quantities or priority rules for removing stock (such as first in first out versus last in first out), it may be preferable to change some two-step picking operations to direct pick operations. Similar considerations can be used to change items from being handled via direct picking to being handled via two-step picking.

The process 600 then ends at 628. With reference again to FIG. 3, the process 300 continues from 348 (or earlier operations, if 348 was skipped), where the output of the process is provided in the form of warehouse orders and their associated warehouse tasks 360 to be fulfilled using direct picking, and warehouse orders and their associated warehouse tasks 362 to be fulfilled using two-step picking.

Example 5—Example Order Fulfilment Scenarios

FIG. 7 provides examples of how picking can be optimized for withdrawal groups of a particular item of a particular wave. The examples are described in conjunction with tables 720, 750, 770, and represent a scenario where a particular item is present in each of five orders of the wave. Assume that the item associated with the tables 720, 750, 770 is defined as being available as caches, a box of five caches, or a pallet of three boxes (thus containing fifteen caches).

Each table 720, 750, 770 includes a column 704 indicating an order number or identifier, a column 706 indicating an amount of an item included in a particular order, a column 708 indicating whether a particular order (for a given row of one of the tables) is to be fulfilled using two-step picking (for the item represented by the given table), a column 710 indicating a withdrawn amount of items in particular allocation units (caches, boxes, pallets), and a column 712 providing a total number of items in a "base" unit of measure for the item (in many cases, the "base" unit may be caches, but in some cases a smallest fulfillment unit can contain multiple "base" units, such as where a box of lightbulbs contains four lightbulbs, the box is the smallest fulfilment unit, but where multiple boxes could be packaged in a carton, and multiple cartons could be packaged into a pallet). Note that the values in columns 710 and 712 do not necessarily represent values for the orders of the rows in which the values appear. That is, for example, the values in columns 710 and 712 for the first row of the table 720 represent the fulfilment of orders 1-5, not order 1 alone.

The use case of table 720 is a good example of how two-step picking can optimize a fulfillment process. The total quantity of items associated with the orders in the table 720 is fifteen, which exactly equals the number of caches of the item in a pallet of the item. Rather than five separate direct pick tasks, all five orders can be fulfilled using a single retrieval from storage, followed by five allocation tasks at a deconsolidation location to allocate caches in the pallet to the orders in the wave.

In the scenario represented in table 750, the orders in the wave include a total of fourteen of the relevant item. Since fourteen is less than the size of a pallet, a pallet is not selected, since otherwise an "each" of the item would remain after allocating items in the pallet to orders of the wave. However, optimization logic can then determine whether a smaller aggregation unit of the item is available (but larger than the smallest distribution unit, such as eaches, of the item), and, if so, attempt to fulfill orders in the wave using that unit.

In this case, logic identifies "order 1" as including 5 eaches, which exactly matches the quantity of a box. Logic continues to analyze the remaining orders, such as to see whether a combination of the remaining orders (a withdrawal group) exactly equals the quantity of caches in a box. In this case, two options exist. Order 2 and any of orders 4 and 5 total five eaches, which can be satisfied with a box. Alternatively, orders 3, 4, and 5 can be combined to equal 5 caches. In at least some cases, when multiple fulfillment options exist, a fulfilment option is selected that produces the fewest number of warehouse tasks or satisfies some other criteria. In the example provided, satisfying three orders with a box is more efficient than satisfying two orders with a box. In particular, if three orders are satisfied with a box, only three storage retrievals are required—two retrievals of a box and a retrieval of 4 eaches. In the case where order 2 and one of orders 4 and 5 is selected, four warehouse tasks to retrieve items from storage would be required—two retrievals of a box, a retrieval of three each, and a retrieval of the one each for the order that was not designated to be fulfilled from the box.

Table 770 represents a scenario where two-step picking is not selected for any orders in the wave for the particular item being analyzed. In this scenario, the wave incudes a total of ten items. Because ten items is less than the number of caches in a pallet, the unit of a pallet is not considered. Because the number of items in the wave is greater than or equal to the number of items in a box, the unit of a box is considered. The logic applied determines that a box is only selected for use in a two-step picking process if an order or a combination of orders can be exactly satisfied by a box. Since two boxes exactly equals ten caches, in theory all of the orders in the table 770 could be satisfied by two-step picking. However, assume that an inventory check determines that no boxes are available. In this case, two-step picking would not be selected for any of the orders.

Figure 8:
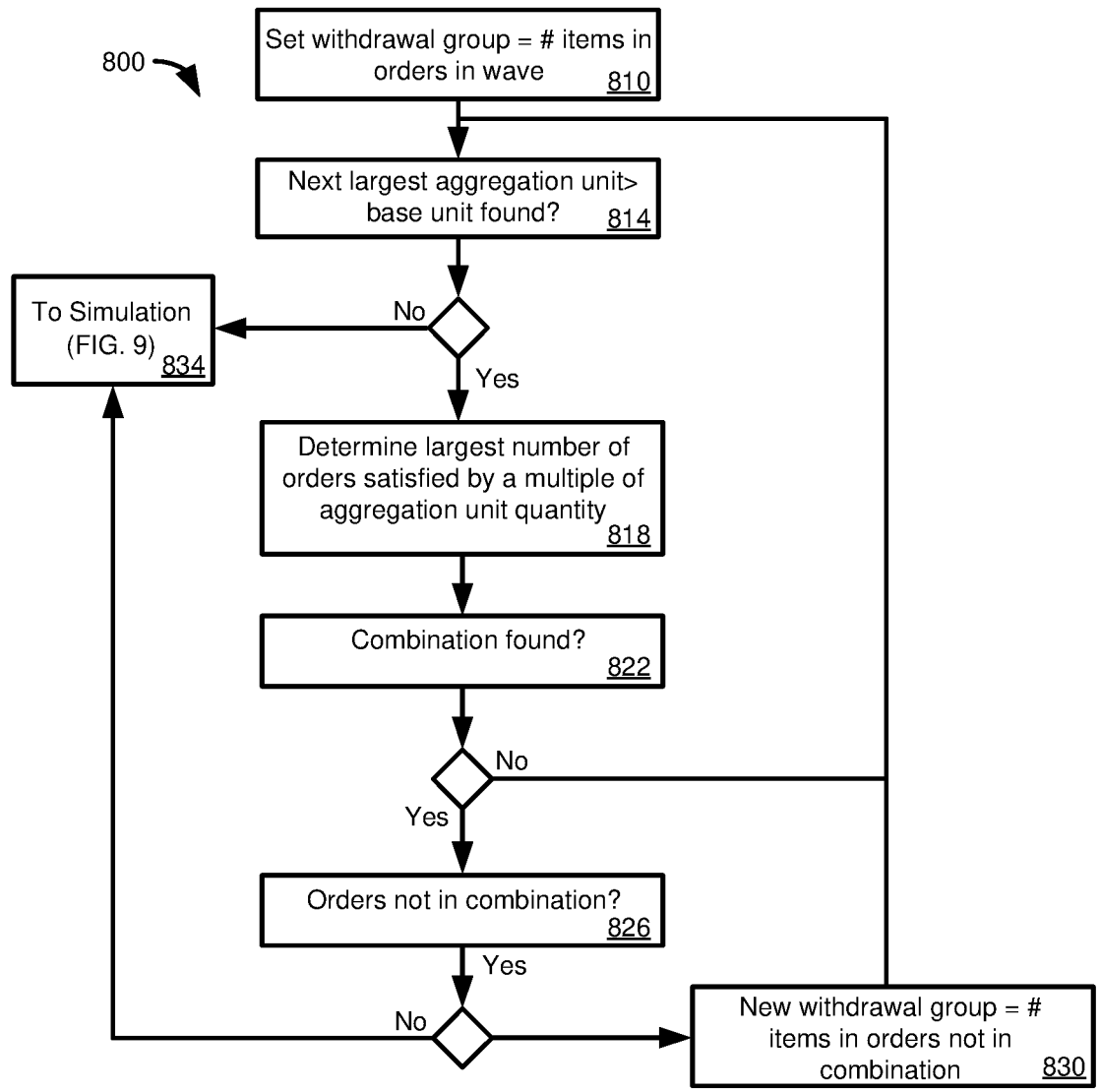
FIG. 8 is a flowchart of a process for defining withdrawal groups to be used with an allocation/distribution process.
Figure 9:
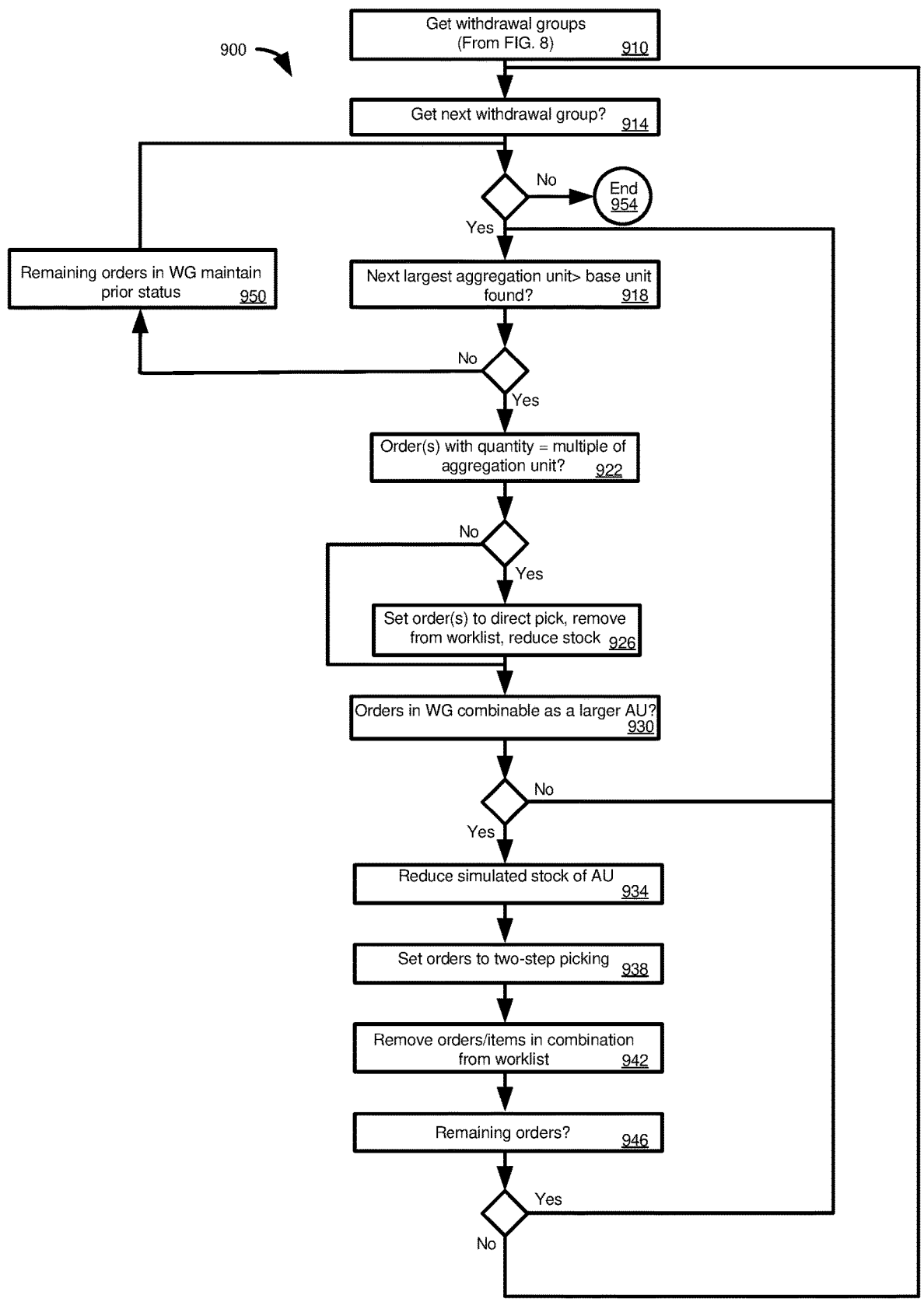
FIG. 9 is a flowchart of a process of determining how to allocate/distribute items to withdrawal groups defined using the process of FIG. 8.

Example 6—Example Order Fulfilment Logic, Including Definition and Satisfaction of Withdrawal Groups FIG. 8 is a flowchart of a process 800 for defining withdrawal groups. FIG. 9 illustrates a process 900 of satisfying/fulfilling withdrawal groups formed using the process 800. The processes 800 and 900 can be carried out for a particular item. In some cases, an "item" can include a plurality of "versions" of the item, such including items regarding of what batch or lot they are associated with, or regardless of a particular supplier or supplier manufacturing facility. In other cases, an "item" can refer to a particular version of an item, where the item version, at least in some scenarios, is not substitutable by another version, at least not if a specified version remains available. At 810, an initial withdrawal group is created, having a number of items equal to a number of orders (wave items) in a wave that specify the item. A process then begins that determines where all of a portion of the orders in the withdrawal group can be satisfied by particular aggregation units.

At 814, it is determined whether an aggregation unit that is larger than a base unit is found. If 814 occurs directly following 810, typically a largest available aggregation unit is used, or at least a largest available aggregation unit that is available to the process 800. As explained above, processes can be defined using custom logic that can override certain aspects of disclosed techniques, including that certain aggregation units should not be used, even if an aggregation unit is defined for an item, and optionally even if the aggregation unit is defined an "in stock."

If it is determined at 814 that an aggregation unit is available to be analyzed, a largest number of orders that can be satisfied by a multiple of the aggregation unit is analyzed at 818. Typically, 818 includes determining if an aggregation unit can exactly satisfy some combination of orders. For example, assume that an item is available in pallets of 15, cartons of 5, and eaches. If a withdrawal group contained an order of 10 and an order of 5, that could be satisfied by a pallet, and so at least one pallet could be used to satisfy at least a portion of the withdrawal group. On the other hand, if one order contained six items and another eight items, a pallet would not be selected, because the orders only contain fourteen items, which is less than that pallet quantity. A similar result could be obtained if the two orders totaled sixteen items.

If a combination is not found at 822, the process 800 returns to 814 to determine whether aggregation unit sizes are available. For example, if it is determined that pallets cannot be used to satisfy at least a portion of the orders, the process 800 may analyze whether at least a portion of the orders can be exactly satisfied by pallets. Consider a scenario with two orders of four items and one order of six items. The order cannot be satisfied by a pallet, since there is no combination or orders that exactly matches the pallet quantity. However, one order of four and the order of six can be satisfied by two cartons. So, this example also emphasis the language in 818 of "a multiple of the aggregation unit." While no combination of orders is exactly satisfied by a single carton, two orders can be satisfied using two cartons.

If a combination is found at 822, such as in the above example, the process 800 proceeds to 826 to determine whether there are orders in the withdrawal group that are not satisfied by the combination identified at 822. If so, the process returns to 814 to determine whether the remaining orders can be satisfied by another aggregation unit size (such as a next smaller size). As part of the operations at 826, the previous withdrawal group is split into two withdrawal groups. One withdrawal group has the orders, and number of items, associated with the combination found at 822. The other withdrawal group has the orders, and number of items, that were not in the identified combination. So, continuing the example above, one order of four and the order of six would be in one withdrawal group, as they are in the identified combination, and the remaining order of four would be part of another withdrawal group, and that withdrawal group would continue be analyzed using another aggregation unit size, if available.

The process 800 continues until no orders remain after a combination found at 822, or after no additional aggregation unit sizes are available for analyzes. This is reflected in the process 800, where if the decision at 814 indicates that no further aggregation units are available or the decision indicates that no orders exist that are not in a most recently identified combination, the process proceeds to the simulation process 900 of FIG. 9 at 834.

Finding a combination at 822 can be carried out in a number of ways. According to one technique, a subset-sum algorithm is used. A subset-sum algorithm can be used to determine whether a set of values can sum to a target value. In some cases, existing subset sum algorithms may not be suitable for use with disclosed techniques. Example 9 provides an improved subset-sum algorithm that can be less computationally expensive. For example, an initial analysis of a withdrawal group can provide a result that can be used to analyze multiple aggregation group sizes.

Note that the process 800 can result in at least one withdrawal group that includes items that are not optimized, or optimizable, using aggregation units. For example, assume the process 800 ends with an order of three items and an order of four items in the withdrawal group being analyzed. Or, assume that the process 800 ends with an order of five items and an order of two items. In the first case, the orders cannot be satisfied by an aggregation unit if the smallest aggregation unit is a carton of five items. In the second case, the order of five can be satisfied by a carton, but the order of two items cannot be satisfied by an aggregation unit.

The process 800 can be carried out without regard to whether particular aggregation units are available for satisfying the orders in a wave. The process 900 checks to see how withdrawal groups from the process 800 can be satisfied using particular, such as current, stock information. The process 900 can be referred to as a "simulation," as in some cases the process results in the identification of possible withdrawal tasks, but the withdrawal tasks are not actually created as part of the process.

Withdrawal groups are obtained at 910. In a particular implementation, the withdrawal groups are those created for a particular set of orders for a wave according to the process 800. The process 900 can continue for multiple withdrawal groups, so the process can include an operation at 914 to determine whether additional withdrawal groups remain to be analyzed. When no withdrawal groups remain to be analyzed, the process 900 can end at 954.

If at least one withdrawal group is available, a withdrawal group (such as next group on a stack or in a queue) is selected for processing. At 918, it is determined whether an aggregation unit is available that is larger than a base unit is available. In this case, "availability" can mean not just that such an aggregation unit is "defined," but also that such an aggregation unit is available to the process 900. In some cases, "available" can simply mean "in stock." In other cases, aggregation units may exist/be "in stock" in a general sense, but not be available to the process 900.

If it is determined that an aggregation unit is available, at 922, it is determined whether any orders in the withdrawal group can be exactly satisfied by a multiple of the aggregation unit. If so, at 926, these orders are indicated for direct picking, are removed from a worklist (that is, not considered in further operations for the withdrawal group), and the appropriate number of units of the aggregation unit are removed from available stock.

After 926, or if it is determined at 922 that no orders can be exactly satisfied by a multiple of the aggregation unit, it is determined at 930 whether any orders in the withdrawal group are combinable as a larger aggregation unit. As an example, consider again a scenario where an item is available in aggregation units of pallets of fifteen eaches and in cartons of five eaches. Assume that orders in the withdrawal group include three orders of five items and one order of four items. The three orders of five items each correspond to a different, smaller, aggregation unit, but can also be satisfied using a pallet. According, 930 would return a positive result for this example. On the other hand, if there were two orders of five, an order of three, and an order of four, none of the orders could be combined into a larger number of items that can be exactly satisfied by the allocation unit.

Finding a combination at 930 can be carried out in a number of ways. According to one technique, a subset-sum algorithm is used. A subset-sum algorithm can be used to determine whether a set of values can sum to a target value. In some cases, existing subset sum algorithms may not be suitable for use with disclosed techniques. Example 9 provides an improved subset-sum algorithm that can be less computationally expensive. For example, an initial analysis of a withdrawal group can provide a result that can be used to analyze multiple aggregation group sizes.

In the case where 930 results a positive result, the quantity of aggregation units used in the combination are removed from the simulated stock 934. The orders in the combination can then be set for two-step picking at 938. The orders, and their associated items quantities, are then removed from the worklist at 942.

It is determined at 934 whether there are remaining orders in the withdrawal group. If there are remaining orders, the process 900 returns to 918 to determine whether another aggregation unit, such as a next smaller aggregation unit, is available. As an example, it may be determined that some orders can be satisfied by a pallet, and remaining orders can be analyzed if a combination of remaining orders can be satisfied by cartons. If it is determined at 942 that no orders remain in the withdrawal group being analyzed, the process 900 can return to 914 to determine whether additional withdrawal groups remain to be analyzed.

As can be seen, the process 900 can result in all orders in a withdrawal group being satisfied by one or more aggregation units of differing sizes, or can result in some orders not being satisfied by an aggregation unit. After it is determined at 918 that no additional aggregation units are available for analyses, the process 900 proceeds to 950. In some cases, orders can remain in a withdrawal group that are not satisfiable using an aggregation unit, either as a direct pick designation at 946 or as two-step picking from a designation at 930. In these situations, at 950, the remaining orders can optionally be left to a "default" picking state. In some cases, the picking process is designated in master data for the relevant item being analyzed in the process 900. The process 900 then returns to 914 to determine whether additional withdrawal groups remain to be analyzed.

Example 7—Example Fulfilment Scenarios Using Withdrawal Groups

The logic 800 and the logic 900 involve the creation and use of "withdrawal groups." A withdrawal group is a subset, either a proper subset (containing less than all elements of a parent set) or an improper subset (containing all of the elements of, and thus being equal to, a parent set), of a set of orders in wave and having a common item. The use of withdrawal groups helps optimize a fulfilment process, as it allows orders to be treated in units that can be satisfied by an aggregation unit even if the entire "base" set of orders cannot be satisfied by an aggregation unit (or more particularly an aggregation unit of a particular type).

As a more concrete example, consider a wave having three orders, an order for two units of an item, an order for five units of an item, and an order for fifteen units of an item, where the item is available in aggregation units of pallets having fifteen items and boxes having five items, as well as "caches." If the entire set of orders needed to be considered as a set or group, it would not be able to be satisfied by any of the aggregation units. However, the order with fifteen units can be satisfied by the pallet, and thus can be considered a withdrawal group that can be treated separately from the other two orders. Because the withdrawal group is exactly satisfied by an aggregation unit, it can be fulfilled via direct picking.

The remaining two orders can then be considered. Since the order of five items is exactly satisfied by a box, it can be treated as its own withdrawal group and satisfied by direct picking. Since the remaining order only has three items, it also can be satisfied by direct picking, but in the base aggregation unit (caches).

Note that the use of withdrawal groups helps optimize between two-step picking and direct picking, since a subset of orders can be considered, and the choice of two-step picking and direct picking can be made dynamically, considering a particular set of orders in a way, rather than being configured for particular items, or all items, regardless of the nature of the orders that are received.

Also note that withdrawal groups are not limited to being created for direct picking. That is, consider the above scenario, but now with orders of three, three, and four. These orders individually cannot be satisfied by any aggregation unit. However, considering them together as a withdrawal group allows their item quantities to be combined, to a total of ten, which can be satisfied by two boxes. Thus, using withdrawal groups helps reduce the number of allocation units removed from storage, which can reduce the number of warehouse tasks, saving computing resources.

FIGS. 10A-10D provide additional examples of how orders in a wave can be assigned to either two-phase or direct picking in a way that optimizes a fulfilment process, including through the use of withdrawal groups. FIGS. 10A-10D illustrate variations on a common scenario, where an environment 1000 includes a storage 1004, a deconsolidation area 1008, and an issuance area 1012, where the issuance area includes a plurality of orders 1016, shown as orders 1016a-1016f.

The storage area 1004 holds quantities of an item, which is available in defined allocation units of the item, including pallets 1020, boxes 1022, and eaches 1024, where a box contains five caches, and a pallet contains three boxes or fifteen eaches. Taking the scenario of FIG. 10A first, all of the various allocation units are available in the storage, including aggregated units, the pallets 1020 and the boxes 1022. In this case, orders 1016a-1016e contain fifteen items in total, which exactly equals the quantity of items in a pallet 1020. Accordingly, orders 1016a-1016e can be designated for two-step picking where a pallet 1020 is removed from storage 1004 to the deconsolidation area 1008, and from the deconsolidation area the items in the pallet are distributed to the orders 1016a-1016e, which form a withdrawal group.

Order 1016f is for five items, which can be satisfied entirely by a box 1022. Therefore, the order 1016f is set to be satisfied by a direct picking process. Note that the scenario thus results in only two steps of removing items from storage 1004 as opposed to using direct picking for all six orders. Thus, the use of withdrawal groups can help define two-step picking tasks that are more efficient than simply considering the number of items in an entire set of orders for a wave.

Figure 10A:
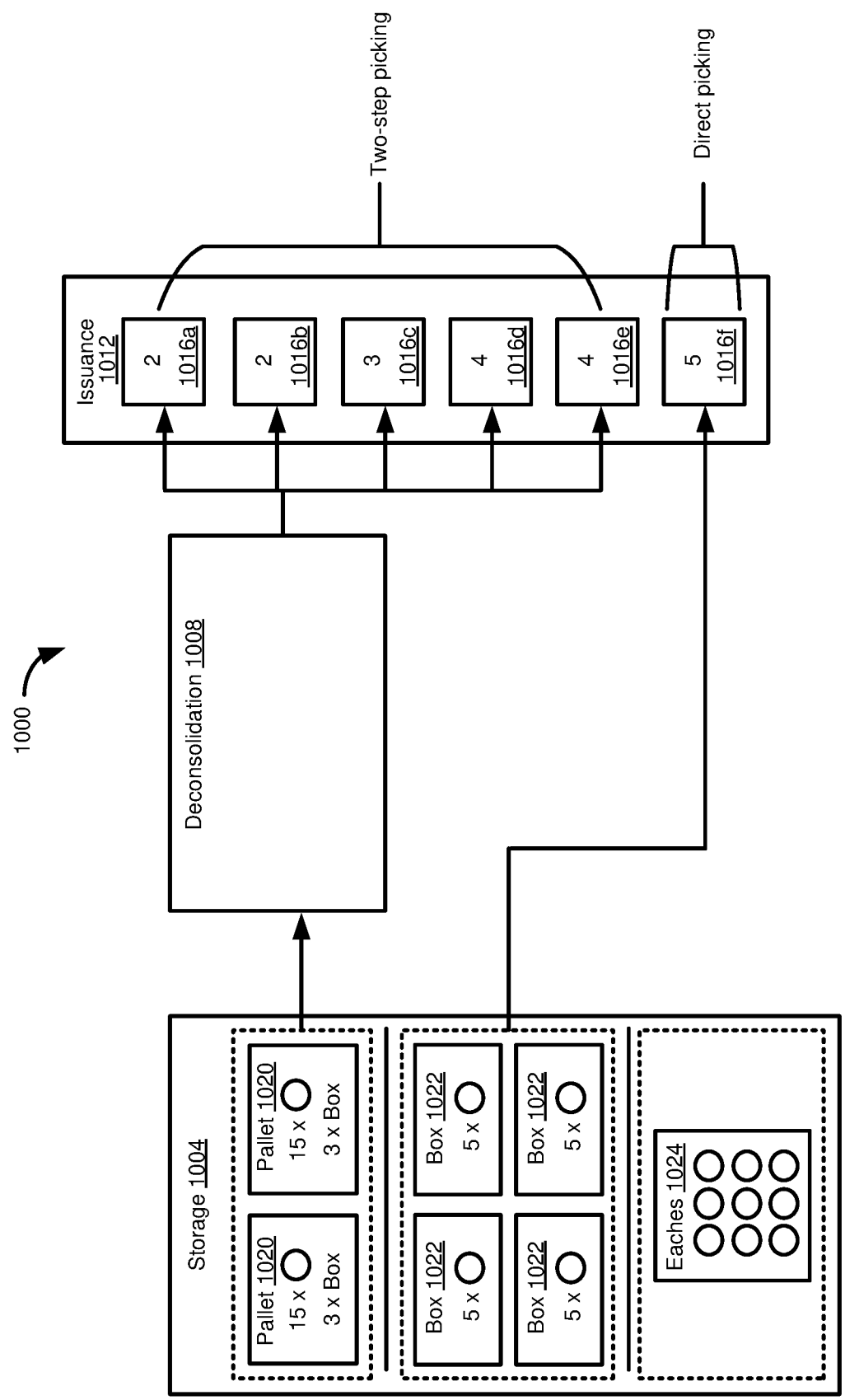
FIGS. 10A-10D are diagrams illustrating various item allocation scenarios demonstrating the use of techniques of the present disclosure.
Figure 10B:
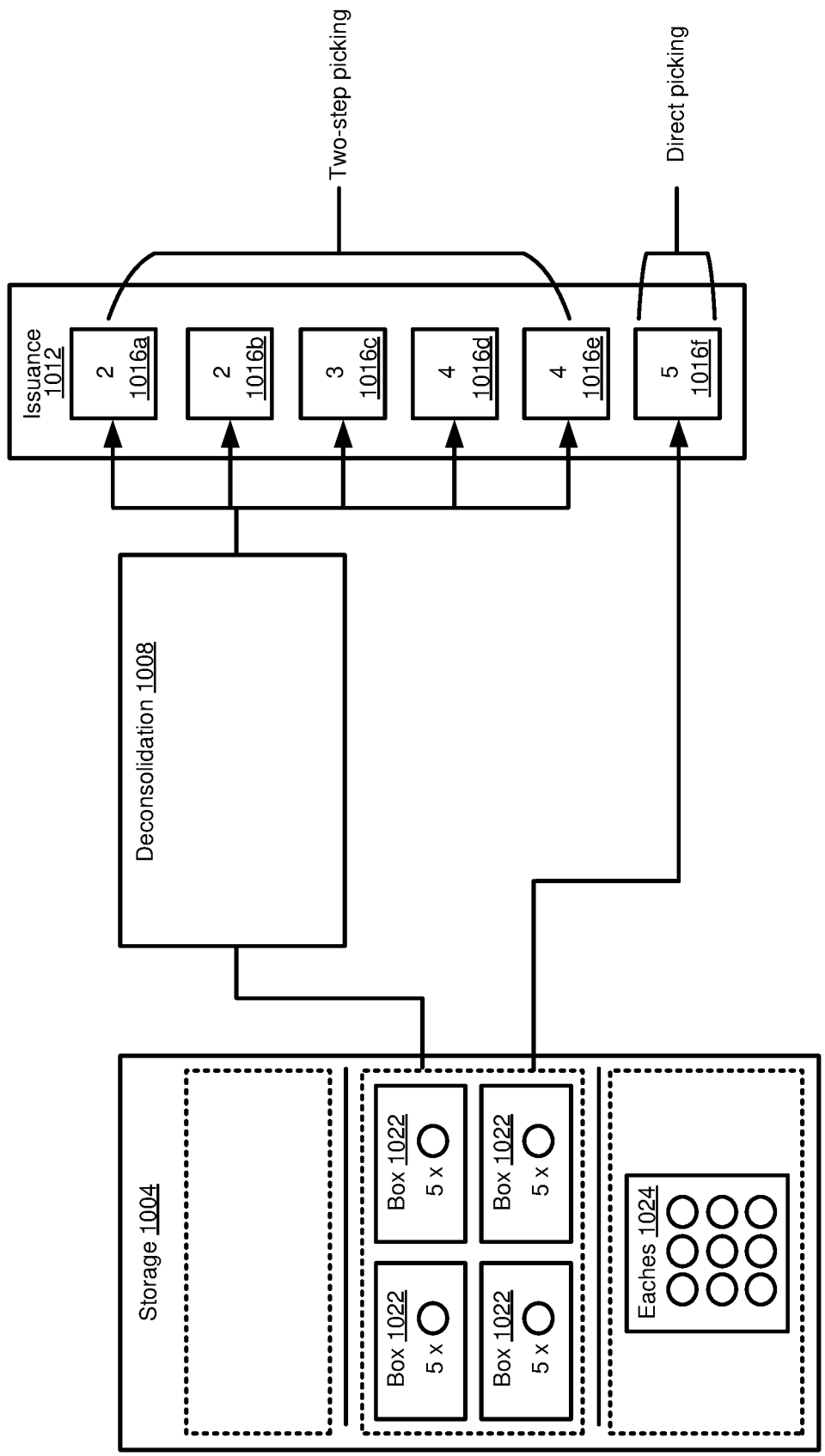

The scenario in FIG. 10B is identical to that of FIG. 10A with respect to the nature of the orders 1016a-1016f. However, in this scenario the inventory status is such that pallets 1020 of the item are not available. That is, pallets 1020 may be defined/an aggregation unit that can be available, but is not currently available. In this case, processing logic (such as the processing logic 800 or 900) for order fulfillment determines that pallets 1020 are not available, and instead analyzes fulfillment possibilities using boxes 1022. In this case, it is determined that three boxes 1022 can be used to satisfy the orders 1016a-1016e as a withdrawal group, with deconsolidation of the boxes in the deconsolidation area 1008. As with the scenario of FIG. 10A, the order 1016f can be satisfied with a direct pick operation of a box 1022. While the scenario of FIG. 10B is less efficient than the scenario of FIG. 10A, it still results in fewer tasks of withdrawing items from storage 1004—four tasks as compared with six tasks if direct picking was used for all of the orders 1016a-1016f.

Figure 10C:
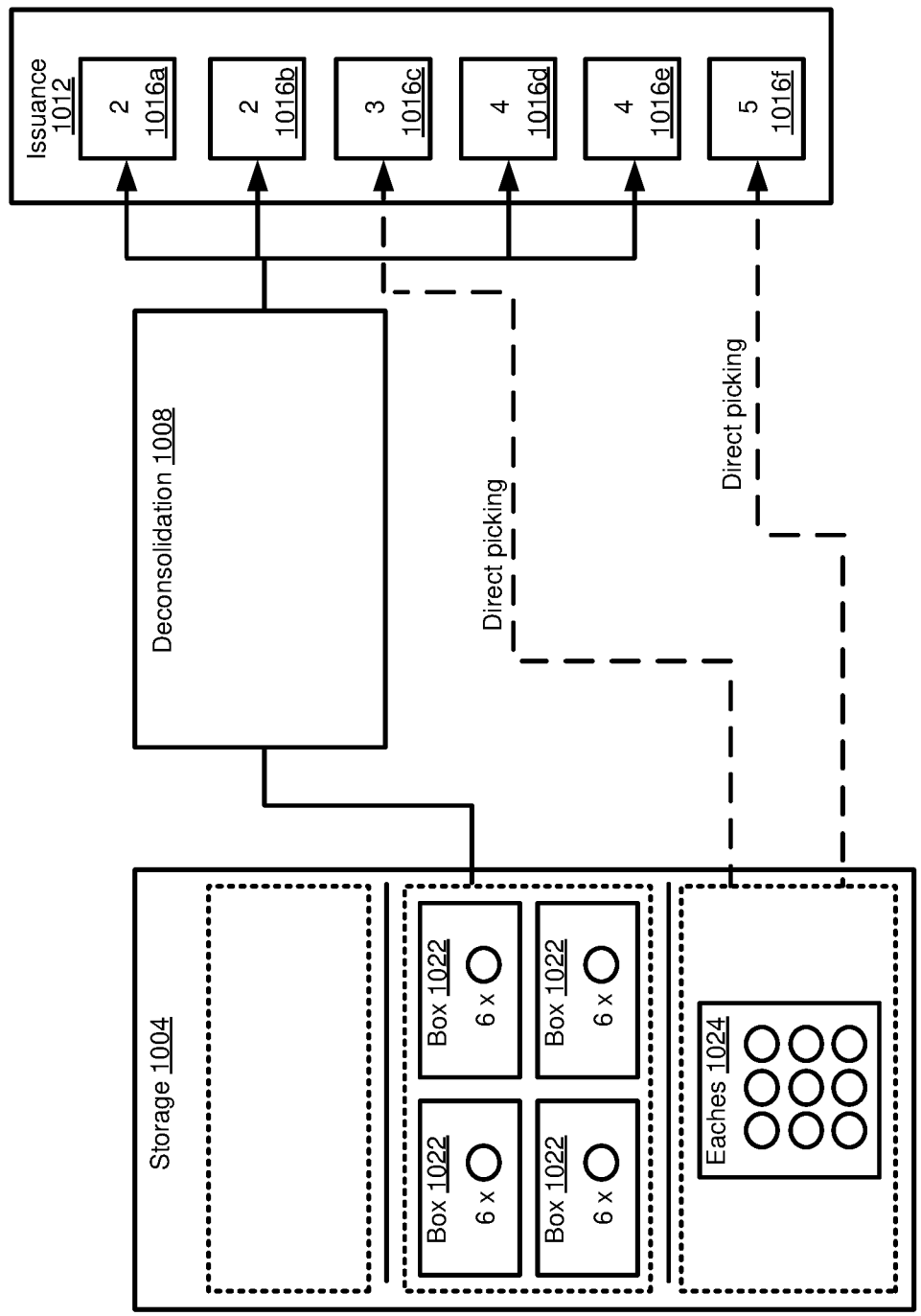
Figure 10D:
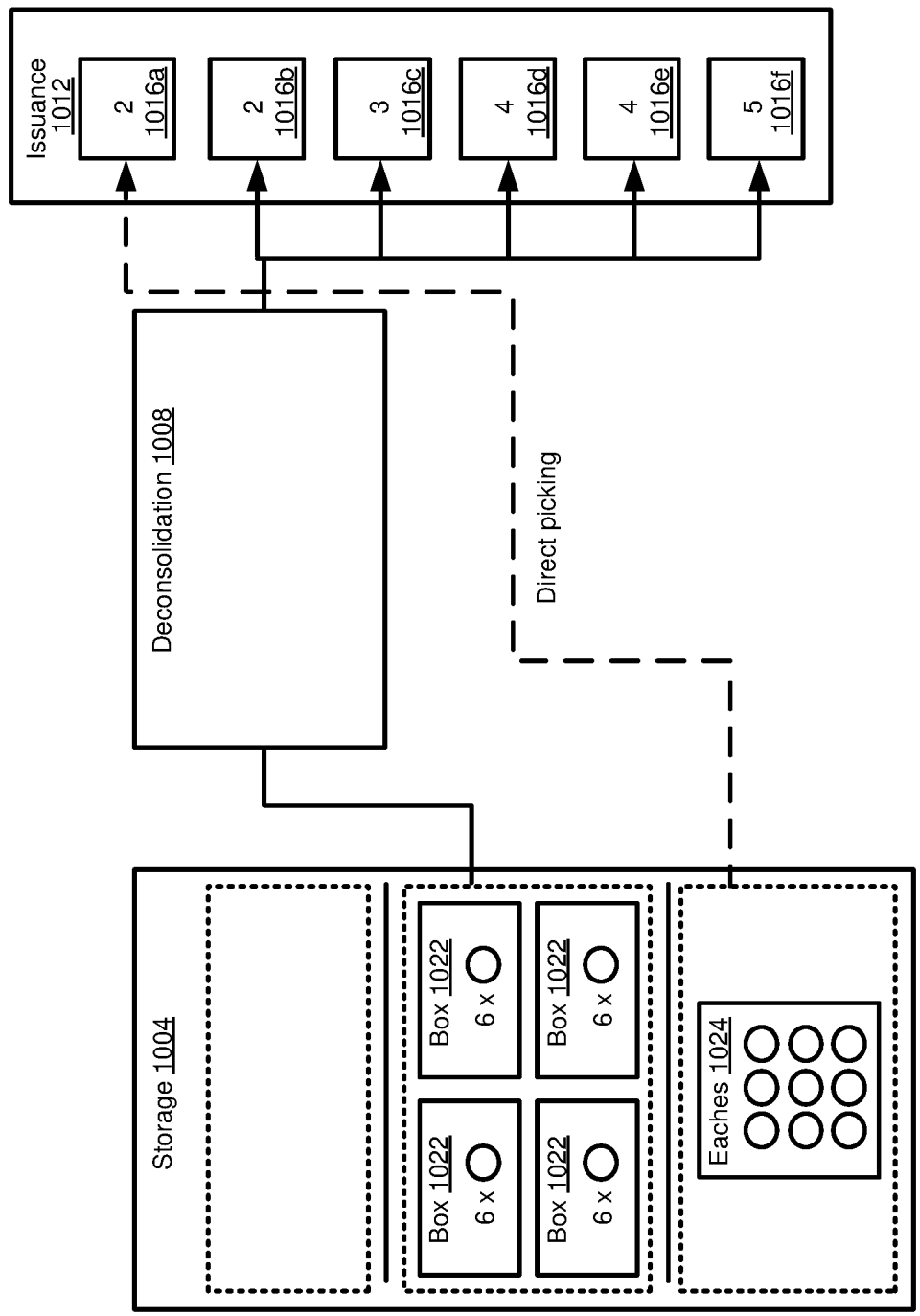

The scenario of FIG. 10C is similar to FIG. 10B, where pallets 1020 are not available. However, in this case, the boxes 1022 have a quantity of six caches rather than five caches, as was the case for the scenarios of FIGS. 10A and 10B. As can be seen, the change in the number of items in a box 1022 quantity has a significant affect on the fulfillment operations. According to fulfillment logic, the number of cumulative items in the orders 1016a-1016f is determined.

The scenario of FIG. 10C differs somewhat from a result that may be obtained using the logic 800. That is, the scenario 10C can represent a result when logic attempt to create withdrawal groups of a particular size corresponding to a particular aggregation unit, in this case pallets 1020, without regard to whether such an aggregation unit is available. Using this logic, it is determined that an amount of items, fifteen, corresponding to a pallet, can be achieved using orders 1016*a*-1016*e*. However, since only boxes 1022 are available, only orders 1016*a*, 1016*b*, 1016*d*, 1016*e* can be satisfied using boxes 1022, and so order 1016*c* must be fulfilled via direct picking. Since order 1016*f* was not included in the set of orders for a pallet quantity in the first place, it is fulfilled using direct picking, using the allocation unit of caches 1024.

Rather than defining withdrawal groups with respect to a set size, the logic 800 will analyze progressively smaller withdrawal groups, corresponding to smaller aggregation units, if an aggregation unit size cannot be exactly satisfied by a combination of orders. The result of this logic is illustrated by scenario of FIG. 10D, which is identical to the scenario of FIG. 10C except for the fulfillment results.

Applying the logic 800 to the parameters of this scenario, rather than trying to achieve a quantity of fifteen items from the orders 1016*a*-1016*f*, corresponding to a pallet, the logic attempts to generate withdrawal groups corresponding to multiple of six, the number of items in a box 1032. Applying this logic results in orders 1016*b*-1016*f* being included in a single withdrawal group, whose eighteen items can be satisfied using three boxes 1032. Only order 1016*a* requires a separate withdrawal group, which is satisfied using direct picking of caches 1024.

Example 8—Example Definition and Use of Withdrawal Groups in Order Fulfilment

The following additional examples are provided to illustrate how withdrawal groups can be defined, and decision processes for setting two-step picking or direct picking for orders in a withdrawal group. In some cases, these examples can be achieved using the logic 800, in other cases the examples can be achieved by using different logic/modifying the logic.

Figure 11A:
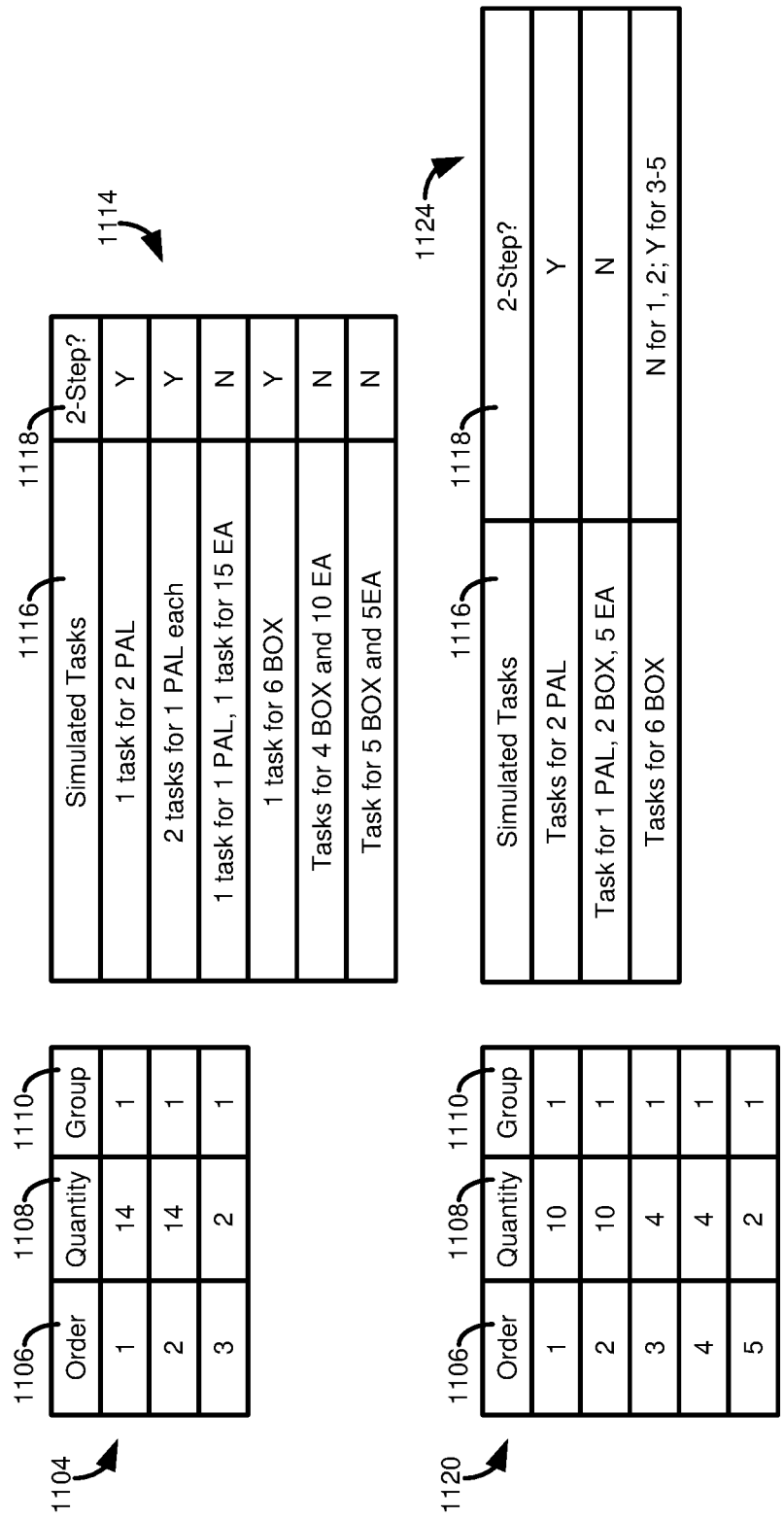
FIGS. 11A and 11B illustrate additional allocation scenarios demonstrating the use of techniques of the present disclosure.
Figure 11B:
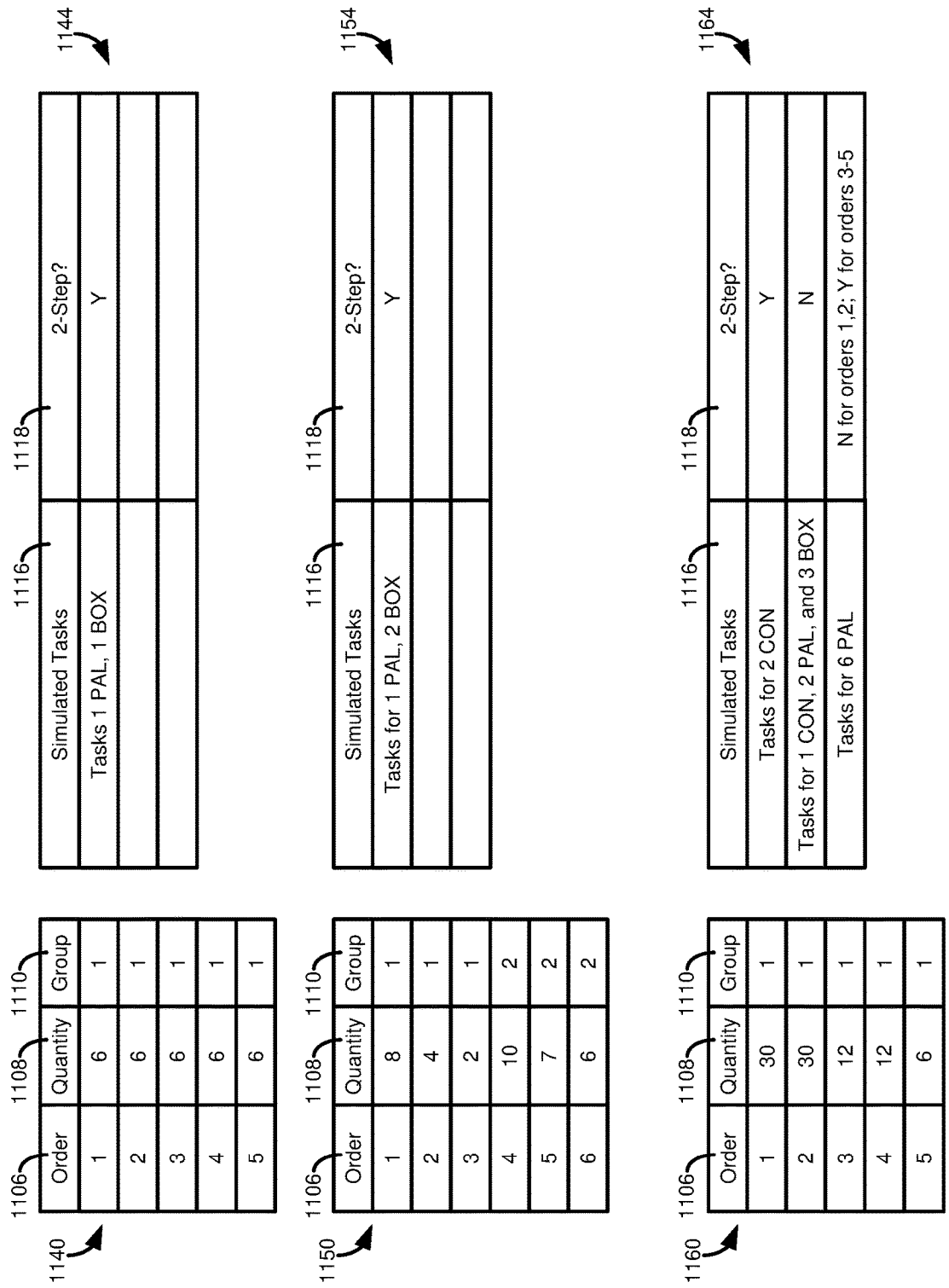

Referring first to FIG. 11A, a table 1104 lists orders in a wave, the table having a column 1106 for an order number/ID, a column 1108 for a quantity of items in the order, and a column 1110 indicating a withdrawal group to which an order (corresponding to a row of the table) is assigned. The scenario for the table 1104 is based on an item that is available in pallets of 15 caches, boxes of 5 caches, or as caches. The total quantity of items in the orders is 30, which can be satisfied by 2 pallets, and so all of the orders are considered in a single withdrawal group.

A table 1114 lists various simulated tasks that can be generated to fulfill the orders of the table 1104, and includes a column 1116 provided details of the fulfilment tasks and a column 1118 indicating whether two-step picking is selected for a given set of one or more fulfilment tasks. Note that according to the logic used in generating the tasks of the column 1116, two-step picking is selected for all orders in a withdrawal group—either all orders in the withdrawal group are satisfied using two-step picking or all of the orders are satisfied using direct picking.

The results shown in the table 1114 illustrate that two-step picking is set only if the warehouse tasks in the column 1116 do not involve picking any items in a quantity corresponding to a base (or smallest available) allocation unit. However, the same results could be obtained using the logic 900, as the logic includes the condition that two-step picking is not selected if an aggregation unit does not exactly equal an amount that can be achieved exactly by a combination of orders. For the orders of the table 1104, no order by itself satisfies an aggregation unit of pallets or boxes, and the only way any aggregation units can satisfy the condition is if all of the orders are considered together, as the combination of any of the other two orders does not equal an available/defined aggregation unit for the item.

Table 1120 uses the same item allocation units as for the scenario of table 1104, and also includes orders with a combined item total of 30, but with different orders/item numbers per order. Table 1124 illustrates example simulated tasks for fulfilling this set of orders, and whether/what orders are satisfied using two-step picking versus direct picking. As with the earlier scenario, since all of the orders can be satisfied using the quantity of pallets, all of the orders are considered to be part of the same withdrawal group. It can be seen from table 1124 that a variety of fulfillment options exist. Two-step picking could be used for all orders using two pallets, although no single order corresponds to a pallet quantity.

Alternatively, the orders could be satisfied using a pallet, 2 boxes, and 5 eaches. However, two-step picking would not be used in this case—because fulfillment still requires the withdrawal of eaches, or because there is no combination of orders that exactly satisfies the quantity of items in a box or in a pallet. If pallets are not considered, orders 1 and 2 could be satisfied using four boxes, and orders 3-5 can be satisfied by satisfied by another two boxes. Since orders 1 and 2 can each be exactly satisfied by box quantities, they are fulfilled using direct picking. Two-step picking is used for orders 3-5, since, while the quantity in two boxes exactly equals the quantity of items in the orders, it does not exactly match any single order of orders 3-5.

Now consider a somewhat modified scenario where a pallet includes 23 items and a box includes 7 items. The orders considered are summarized in table 1140, and consist of five orders of 6 items each, for a total of 30 items. Because there is no order or combination of orders that can be satisfied by a pallet or a box, the orders are considered as a single withdrawal group. Alternatively, the single withdrawal group could be the result of logic recognizing that the total item quantity for the orders corresponds to the sum of two different, available aggregation units—a pallet and a box.

The scenario of table 1140 represents an example of the "residual" logic 900 of FIG. 9. That is, rather than "abandoning" consideration of pallets because no combination of orders exactly matches a pallet quantity, the logic considers whether the "residual" remaining after satisfying an order corresponds to another, smaller aggregation unit, which in the case of table 840 is true, since the residual of 7 exactly equals a quantity of items in a box. Thus, table 1144 shows that tasks for removing a pallet and a box are defined, and that all of the orders are satisfied using two-step picking.

Table 1150 provides orders for a scenario illustrating how it can be beneficial to split a group of orders into multiple withdrawal groups. The scenario for table 1150 again considers a pallet of 23 items and a box of 7 items. Logic determines that a pallet quantity of 23 can be reached by combining orders 4, 5, and 6, or 1, 3, 5, and 6. In either case, the number of items in the remaining orders totals 14, which can be satisfied by two boxes. Since no order can be exactly satisfied by an aggregation unit, all orders are fulfilled using two-step picking, as indicated in table 1154, which also provides the tasks for removing one pallet and one box from storage.

Note that the example of table 1150 has two withdrawal groups, but the example of table 1140 only includes a single withdrawal group, even though the fulfilment tasks are similar (differing by one box), and all orders are satisfied using two step picking. This difference results from the fact that the 30 items of the orders of the table 1140 correspond exactly to the number of items in a pallet and a box, while the number of items in the table 1150, 37, does not. However, breaking the orders satisfiable using a pallet into a separate withdrawal group from the remaining orders allows a withdrawal group to be satisfied using the pallet aggregation unit.

Tables 1160, 1164 provide a final example of optimizing a fulfilment plan. In the corresponding scenario, an additional aggregation unit is available. In particular, a container is available that includes three pallets, where each pallet includes three boxes, and each box includes five eaches. The total number of items in the orders listed in table 1160 is 90. Since 90 is the multiple of the number of items in a container, the orders are considered as a single withdrawal unit. Various options for tasks that can be used to fulfill the orders are shown in table 1164.

From looking at the table 1160, it is clear that, while two-step picking could be used for all orders through the selection of two containers, orders 1 and 2 can be exactly satisfied by pallets. In this case, orders 1 and 2 are fulfilled by direct picking, while orders 3-5 are fulfilled using two-step picking, using an appropriate combination of pallets and/or boxes. However, typically more effort is required to select different allocation units of the same item so, barring other considerations (such as inventory considerations), orders 3-5 would be satisfied using boxes.

The appropriate number of items for all of the orders could also be achieved using one container, two pallets, and three boxes. However, the two pallets would be used for fulfilling one of the orders of 30 items, which would leave a container of 45 items and three boxes of 5 items each remaining. These aggregation units would not satisfy directly any of the remaining orders.

Example 9—Example Technique for Determining Sums, and Subsums Thereof, Using a Set of Elements As explained in prior examples, aspects of the disclosed technologies involve trying to determine whether a particular quantity can be reached by combining one or more other quantities. For example, a problem might be to determine whether an item quantity for a particular aggregation unit can be achieved by combining orders with varying amounts of an item. This is referred to in the field of computer science as the "subset-sum" problem. While algorithms exist to address the subset-sum problem, the algorithms can be computationally expensive, including to an extent that they may be impractical for real-world solutions, such as in the context of order fulfillment.

The present disclosure provides an improved solution to the subset-sum problem. One advantage to the proposed solution is that is allows the efficient calculation of a result using a backtracking approach. Another advantage is that data structures generated during an iteration of the algorithm can be reused, providing a result more quickly and conserving computing and energy resources.

The improved subset-sum algorithm is explained in conjunction with FIG. 12. The technique is an example of dynamic programming, where a problem is broken down into a series of subproblems. The results of these subproblems are saved, or cached, allowing their reuse for other relevant problems. The example proceeds with the problem of finding a subset to create the sum of 10. The solution involves finding subsets that provide the subsums of 0-9.

A table 1200 is used first for explanatory purposes, and provides the general structure of other tables (1210, 1220, 1240) that demonstrate the use of the algorithm. The table 1200 includes a column 1204 indicating a number of elements considered to a point in the algorithm represented by a given row, a column 1206 that tracks elements (values) to be analyzed to determine whether a particular sum can be achieved using that element (and prior elements), and columns 1208a-1208k represents the sum to achieve, as well as the subsums of that value.

Starting first at element 0, an X is placed in the column 1208a representing the subsum to be achieved, in this case 0. The value of "X" indicates that the sum of 0 can be achieved by adding nothing (since no value of the column 1206 is provided for the first row) to a starting value of 0. The remaining rows have column 1208a filled with the value of "C," which indicates that the subsum is achievable, but without adding the element of a lower, current row. The value of "C" also indicates that a prior row also had a value of "C," or a value of "X." That is, if no proceeding row provides a solution to the sum, no value is provided for the column, if a current row provides a solution, a value of "X" is used, and if a current row does not provide a solution, but a solution is provided by a prior row (having a "C" or an "X"), a value of "C" is used.

Table 1210 has the same structure as the table 1200, but represents the results of further analysis of the values of the table 1200. In this case, it is determined that adding the new element from column 1206, 2, can be used to produce the sum of two, so an "X" is placed in column 1208c. Note that, other than the subsum of 0, as indicated in column 1208a (since it has the value of C), no other sums can be achieved by adding the value of two, given the conditions of the table 1210 (that is, a different result may be obtained if different values were used in column 1206). As with the prior analysis, the sum of "2" can always be achieved by not adding any additional elements, and so the values for column 1208c for the remaining rows are set to "C."

Table 1220 illustrates the next stage of the analysis, where the next row is considered, which involves adding the value of 3 in column 1206. The value of 3 can be achieved by not adding the value of any prior row, and so an "X" is placed in column 1208d. Since the value of 2 was already considered, and the value of 5 can be achieved by adding 3 to 2, an "X" is placed in column 1208f. No other subsum can be achieved by adding the value of 3, and so the analysis proceeds to the next row.

The analysis continues in a similar fashion, and the final results are shown in table 1240. As another illustrative example, consider the addition of element 4 in the column 1206, the "new" values that can be achieved are 4 (4+0), 6 (4+2), 7 (4+3), and 9 (4+2+3). In the final row, note that an "X" has been placed in the column 1208k, indicating that the value of 10, the sum to be achieved, can be achieved using the elements in the column 1206, which was the original "question."

While in some situations it may be enough to know that a particular sum is reachable, in many cases it is useful to know how the sum can be achieved. This information can also be obtained from the table 1240 through a backtracking process. Since there is an "X" in the current row 1242, and the value of the current row in column 1206 is 4, it is known that 4 is part of a solution for achieving the value of 10. Note that is apparent from the table 1240 that there are no solutions that do not include the value of 4, since there are no "X"s in any other rows for the column 1208k. Since the sum to be achieved is 10, and we know that part of the solution is 4, the remaining sum to achieve is 6, since 6+4=10. So, the table 1240 is analyzed to determine solutions for achieving the sum of 6.

The analysis can proceed by looking at progressively "higher" rows of the table to determine whether the sum of 6 can be achieved. In the next higher row, with the value of 9 for column 1206, a "C" is present in column 1208g, which means that a solution is provided by a preceding row. The next higher row, having a value of 4 for column 1206, is analyzed, and a value of "X" is found. Thus, it is known that 4 is part of a solution of a sum that provides a value of 6. Since both 4 and 4 are part of the solution of achieving 10, the remaining sum to achieve is 2.

Continuing to the next higher row, having a value of "3" for column 1206, a value of "C" is present in the column 1208c, for the sum of 2, indicating that 3 is not part of the solution, but a higher row does provide a solution. Moving to the next higher row, having a value of 2 for column 1206, an "X" is present in column 1208c, indicating that 2 contributes to the solution. Since 10−4−4−2=0, the solution for achieving the sum of 10 has been identified.

To indicate how the results of the algorithm, and its data structure, can be reused, consider the same sequence of elements to be analyzed, but now it is desired to know whether the sum of 5 can be achieved. The algorithm need not be re-executed. Rather, the table 1240 can be directly analyzed to determine whether the sum of 5 is achievable. The final row of the table 1240 provides a value of "C," so it is known that the sum of 5 is achievable using the parameters provided to the algorithm. The values that are present and provide the sum of 5 can be determined using the previously described backtracking technique.

Example 10—Example Data Objects Implemented Disclosed Technologies

FIG. 13 illustrates example computer-implemented data objects that can be used in implementing disclosed techniques. The data objects are shown in the form of tables 1310, 1330, 1350, 1370, 1380, which can be tables implemented in a relational database system. However, it should be appreciated that the data objects can be implemented in other ways, including in data structures or as instances of data types, including abstract or composite data types. For example, the tables 1310, 1330, 1350, 1370, 1380 can be represented instead as instances of abstract data types, where the columns/attributes of the tables are included as data members of a corresponding abstract data type definition.

Table 1310 illustrates how allocation units can be defined for a particular item. The table 1310 includes a column 1312 the provides a unique identifier for the relevant item, a column 1314 that provides an identifier for the particular allocation unit (which can be unique to the item or can be an allocation unit that is used with multiple items), a column 1316 that indicates the number of items in the allocation unit/item combination of a given row, and a name (such as a human-understandable name) for the allocation unit in a column 1318.

The table 1330 illustrates how inventory can be tracked, which can be used, among other things, to determine allocation units that are available when a fulfilment process takes places (such as being used in determining whether pallets are available and should be considered for direct picking or two-step picking processes). The table 1330 includes a column 1332 that provides an identifier for the item and a column 1334 that provides an allocation unit being tracked by a given row, where the values in the columns 1332, 1334 can correspond to the columns 1312, 1314 of the table 1310. A column 1336 indicates a number of the particular item/allocation unit combination that is currently in stock, while a column 1338 provides a location identifier for the item/allocation unit, such as a location in a storage facility. The location information of column 1338 can be used, among other things, in generating task requests to remove particular allocation units of a particular item from storage for a direct or two-step picking task.

The table 1350 illustrates how orders, such as orders in a particular order wave, can be tracked, including associating orders with tasks that are generated to fulfil the orders. The table 1350 includes a column 1352 that identifies a particular order, which can be a value that is unique, or a value that is unique with respect to a particular wave. A column 1354 indicates whether the order has been assigned a direct picking task or a two-step picking task. Note that a given order could potentially be associated with multiple tasks, including a combination of two-step picking tasks and direct picking tasks.

Columns 1356 and 1358 associate particular orders with particular task identifiers used in fulfilling a given order. Column 1356 indicates a withdrawal task for withdrawing items for the order from storage. Column 1358 is used for two-step picking tasks, and represents an operation to deconsolidate items in an aggregation unit and allocate the items to a particular order. Column 1360 identifies the particular item for the particular order fulfilment step represented by a row of the table 1350, while column 1362 indicates the allocation unit for the given item. Column 1364 provides the number of allocation units associated with a task, while column 1366 indicates the number of items from a particular aggregation unit that are to be allocated in the particular task of a particular row of the table 1350. That is, for example, a pallet might be distributed among two orders, and so the column 1366 would be used to indicate the number of items in the pallet that should go to a first task and a number of items in the pallet that should go to a second task.

Table 1370 represents information in a withdrawal task, such as a task indicated in the column 1356 of the table 1350. The table 1370 includes a column 1372 providing a task identifier for a particular withdrawal task, a column 1374 identifying a particular allocation unit used in the task, a column 1376 providing the number of allocation units to be withdrawn as part of the task, and a column 1378 indicating a location from which the allocation unit or units should be withdrawn.

Table 1380 is similar to the table 1370, but represents information for an allocation task in a two-step picking operation. Column 1382 provides an identifier for the allocation task, which can correspond to the column 1358 of table 1350, while column 1384 provides an identifier for a withdrawal task that provides the aggregation units to be distributed by the allocation task, and corresponds to the column 1356 of table 1350, the column 1372 of table 1370. Column 1386 identifies an allocation unit for the allocation task, which can be used, for example, to indicate the number of items in the allocation unit. Column 1388 identifies a particular order for the allocation task, while column 1390 indicates a number of items in the allocation unit that should be allocated to the order of column 1388.

Example 11—Example Techniques

Figure 14A:
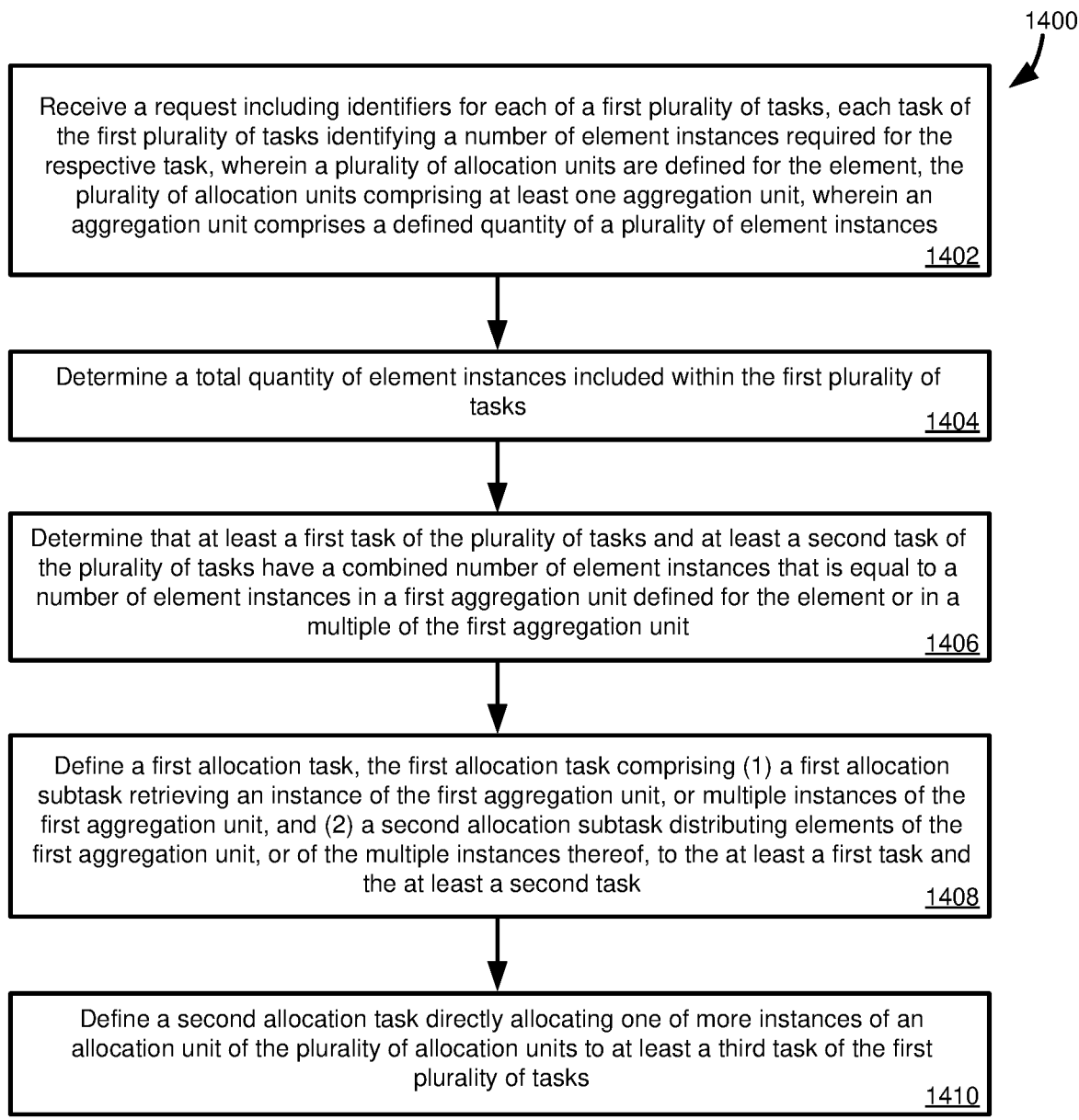
FIG. 14A is a flowchart of an example process for defining allocation tasks for a plurality of tasks, where some tasks of the plurality of tasks are satisfied by a direct allocation task and other tasks are satisfied by distributing element instances from an aggregation unit between a plurality of tasks.

FIG. 14A illustrates an example process 1400 for defining allocation tasks for a plurality of tasks, where some tasks of the plurality of tasks are satisfied by a direct allocation task and other tasks are satisfied by distributing element instances from an aggregation unit between a plurality of tasks. The process 1400 can be carried out using the management system 250 of FIG. 2.

At 1402, a request is received that includes identifiers for each of a first plurality of tasks. Each task of the first plurality of tasks identifies a number of element instances required for the respective task. A plurality of allocation units are defined for the element. The plurality of allocation units include at least one aggregation unit, wherein an aggregation unit includes a defined quantity of a plurality of element instances.

A total quantity of element instances comprised within the first plurality of tasks is determined at 1404. At 1406, it is determined that at least a first task of the plurality of tasks and at least a second task of the plurality of tasks have a combined number of element instances that is equal to a number of element instances in a first aggregation unit defined for the element or in a multiple of the first aggregation unit. A first allocation task is defined at 1408. The first allocation task includes (1) a first allocation subtask retrieving an instance of the first aggregation unit, or multiple instances of the first aggregation unit, and (2) a second allocation subtask distributing elements of the first aggregation unit, or of the multiple instances thereof, to the at least a first task and the at least a second task. A second allocation task is defined at 1410. The second allocation task directly allocates one of more instances of an allocation unit of the plurality of allocation units to at least a third task of the first plurality of tasks.

Figure 14B:
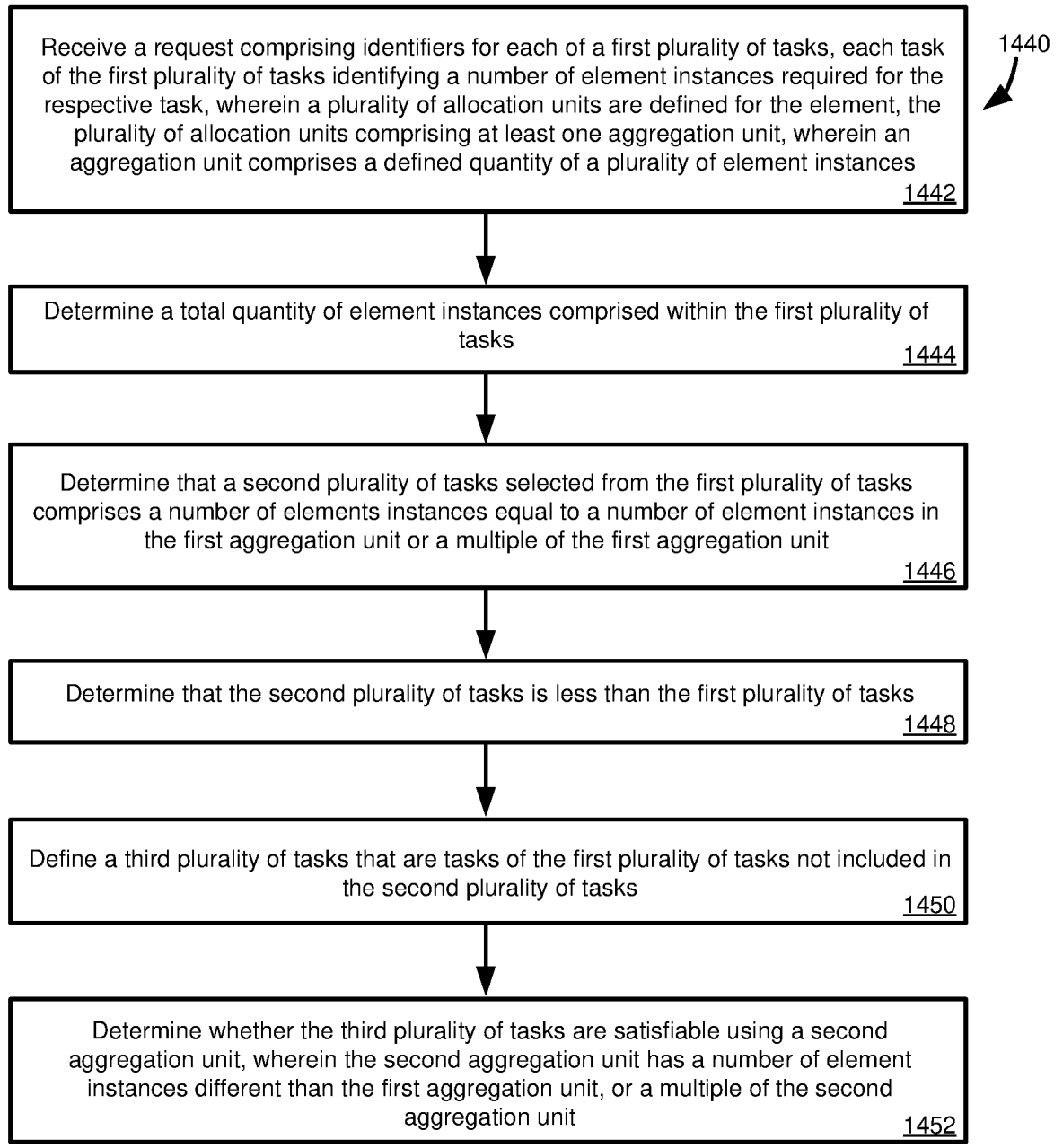
FIG. 14B is a flowchart of an example process for optimizing allocation tasks by dividing a set of tasks into multiple groups, such as withdrawal groups.

FIG. 14B illustrates an example process 1440 for optimizing allocation tasks by dividing a set of tasks into multiple groups, such as withdrawal groups. The process 1440 can be carried out using the management system 250 of FIG. 2.

At 1442, a request is received that includes identifiers for each of a first plurality of tasks. Each task of the first plurality of tasks identifies a number of element instances required for the respective task. A plurality of allocation units are defined for the element. The plurality of allocation units include at least one aggregation unit, where an aggregation unit includes a defined quantity of a plurality of element instances.

A total quantity of element instances included within the first plurality of tasks is determined at 1444. At 1446, it is determined that a second plurality of tasks selected from the first plurality of tasks includes a number of elements instances equal to a number of element instances in the first aggregation unit or a multiple of the first aggregation unit. It is determined at 1448 that the second plurality of tasks is less than the first plurality of tasks.

A third plurality of tasks are defined at 1450 that are tasks of the first plurality of tasks not included in the second plurality of tasks. At 1452, it is determined whether the third plurality of tasks are satisfiable using a second aggregation unit, where the second aggregation unit has a number of element instances different than the first aggregation unit, or a multiple of the second aggregation unit.

Figure 14C:
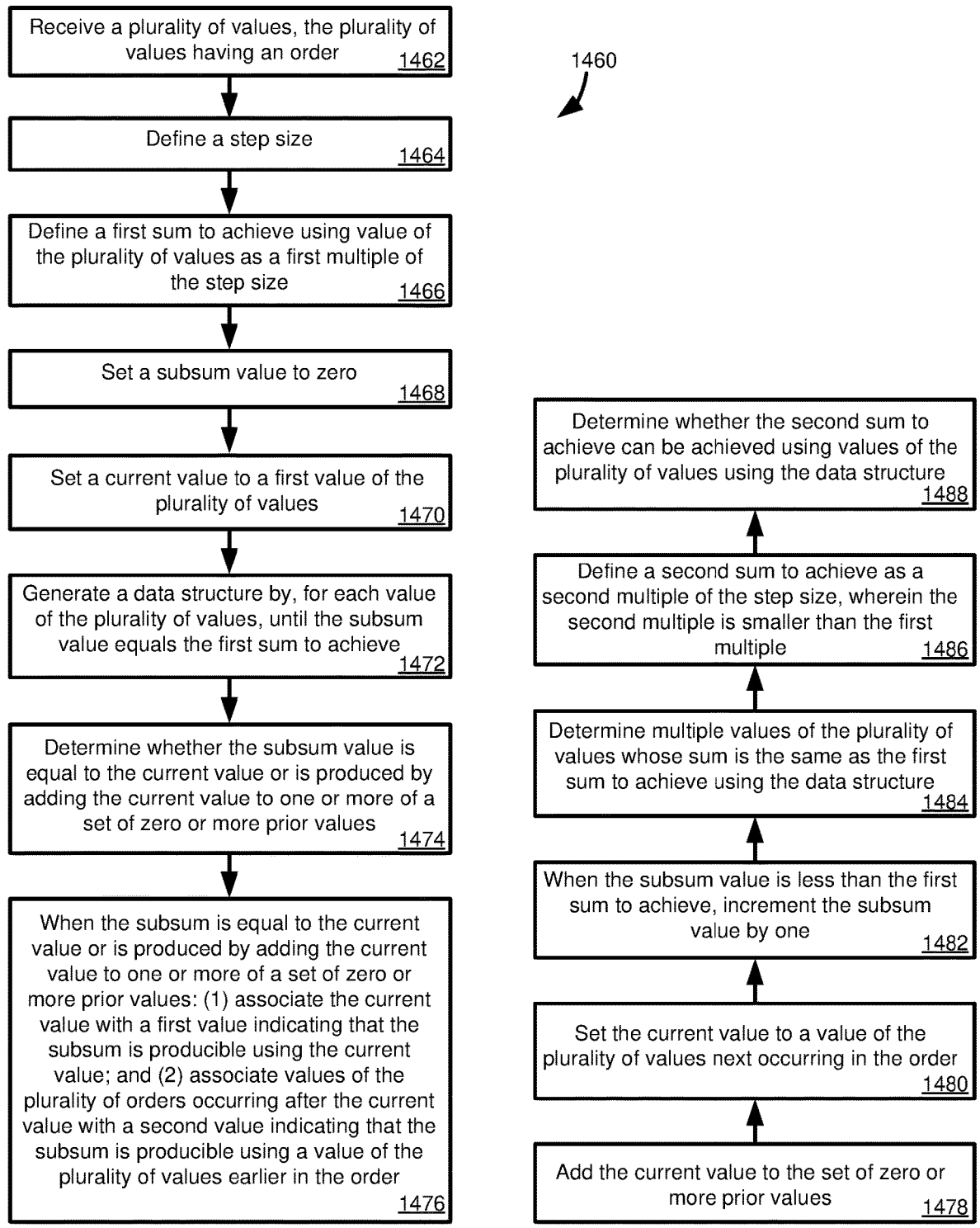
FIG. 14C is a flowchart of an example process for determining whether a sum can be achieved using a given set of values, where the process produces a data structure that is used to analyze multiples of a given step size.

FIG. 14C illustrates an example process 1460 for determining whether a sum can be achieved using a given set of values, where the process produces a data structure that is used to analyze multiples of a given step size. For example, the data structure can be used to determine whether at least a portion of orders in a wave can be satisfied by different multiples of an aggregation unit. The process 1460 can be carried out using the management system 250 of FIG. 2.

At 1462, a plurality of values are received, the plurality of values having an order. A step size is defined at 1464. At 1466, first sum to achieve using value of the plurality of values as a first multiple of the step size is defined. A subsum value is set to zero at 1468. A current value is set to a first value of the plurality of values at 1470. A data structure is generated at 1472 by, for each value of the plurality of values, until the subsum value equals the first sum to achieve, performing various operations.

The operations include determining, at 1474, whether the subsum value is equal to the current value or is produced by adding the current value to one or more of a set of zero or more prior values. At 1476, when the subsum is equal to the current value or is produced by adding the current value to one or more of a set of zero or more prior values: (1) the current value is associated with a first value indicating that the subsum is producible using the current value; and (2) values of the plurality of orders occurring after the current value are associated with a second value indicating that the subsum is producible using a value of the plurality of values earlier in the order. The current value is added to the set of zero or more prior values at 1478. At 1480, the current value is set to a value of the plurality of values next occurring in the order. At 1482, when the subsum value is less than the first sum to achieve, the subsum value is incremented by one.

At 1484, multiple values of the plurality of values are determined whose sum is the same as the first sum to achieve using the data structure. A second sum to achieve is defined at 1486 as a second multiple of the step size, where the second multiple is smaller than the first multiple. At 1488, it is determined whether the second sum to achieve can be achieved using values of the plurality of values using the data structure.

Example 12—Computing Systems

FIG. 15 depicts a generalized example of a suitable computing system 1500 in which the described innovations may be implemented. The computing system 1500 is not intended to suggest any limitation as to scope of use or functionality of the present disclosure, as the innovations may be implemented in diverse general-purpose or special-purpose computing systems.

With reference to FIG. 15, the computing system 1500 includes one or more processing units 1510, 1515 and memory 1520, 1525. In FIG. 15, this basic configuration 1530 is included within a dashed line. The processing units 1510, 1515 execute computer-executable instructions, such as for implementing a data archival environment, and associated methods, such as described Examples 1-12. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 15 shows a central processing unit 1510 as well as a graphics processing unit or co-processing unit 1515. The tangible memory 1520, 1525 may be volatile memory (e.g., registers, cache, RAM), non-volatile memory (e.g., ROM, EEPROM, flash memory, etc.), or some combination of the two, accessible by the processing unit(s) 1510, 1515. The memory 1520, 1525 stores software 1580 implementing one or more innovations described herein, in the form of computer-executable instructions suitable for execution by the processing unit(s) 1510, 1515.

A computing system 1500 may have additional features. For example, the computing system 1500 includes storage 1540, one or more input devices 1550, one or more output devices 1560, and one or more communication connections 1570, including input devices, output devices, and communication connections for interacting with a user. An interconnection mechanism (not shown) such as a bus, controller, or network interconnects the components of the computing system 1500. Typically, operating system software (not shown) provides an operating environment for other software executing in the computing system 1500, and coordinates activities of the components of the computing system 1500.

The tangible storage 1540 may be removable or non-removable, and includes magnetic disks, magnetic tapes or cassettes, CD-ROMs, DVDs, or any other medium which can be used to store information in a non-transitory way and which can be accessed within the computing system 1500. The storage 1540 stores instructions for the software 1580 implementing one or more innovations described herein.

The input device(s) 1550 may be a touch input device such as a keyboard, mouse, pen, or trackball, a voice input device, a scanning device, or another device that provides input to the computing system 1500. The output device(s) 1560 may be a display, printer, speaker, CD-writer, or another device that provides output from the computing system 1500.

The communication connection(s) 1570 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 13—Cloud Computing Environment

Figure 16:
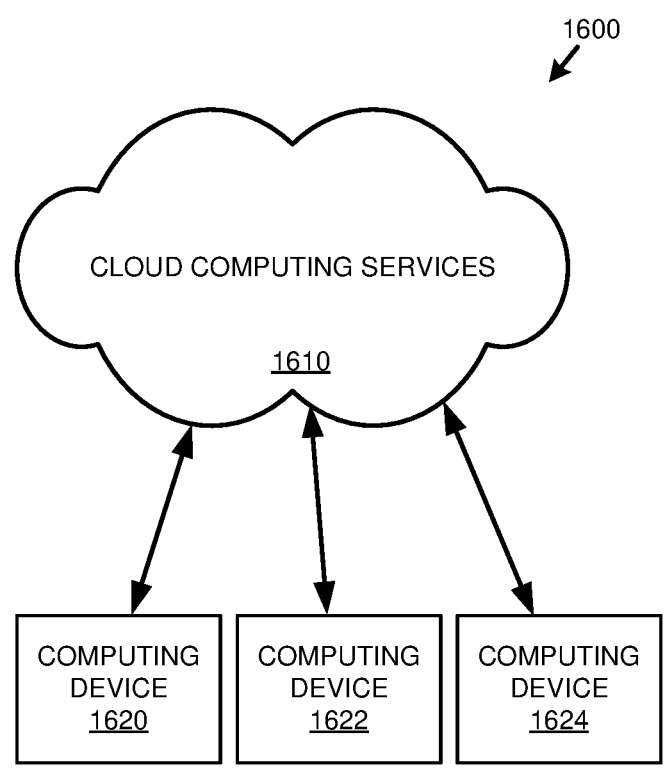
FIG. 16 is an example cloud computing environment that can be used in conjunction with the technologies described herein.

FIG. 16 depicts an example cloud computing environment 1600 in which the described technologies can be implemented. The cloud computing environment 1600 comprises cloud computing services 1610. The cloud computing services 1610 can comprise various types of cloud computing resources, such as computer servers, data storage repositories, networking resources, etc. The cloud computing services 1610 can be centrally located (e.g., provided by a data center of a business or organization) or distributed (e.g., provided by various computing resources located at different locations, such as different data centers and/or located in different cities or countries).

The cloud computing services 1610 are utilized by various types of computing devices (e.g., client computing devices), such as computing devices 1620, 1622, and 1624. For example, the computing devices (e.g., 1620, 1622, and 1624) can be computers (e.g., desktop or laptop computers), mobile devices (e.g., tablet computers or smart phones), or other types of computing devices. For example, the computing devices (e.g., 1620, 1622, and 1624) can utilize the cloud computing services 1610 to perform computing operations (e.g., data processing, data storage, and the like).

Example 14—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 15, computer-readable storage media include memory 1520 and 1525, and storage 1540. The term computer-readable storage media does not include signals and carrier waves. In addition, the term computer-readable storage media does not include communication connections (e.g., 1570).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one hardware processor;
at least one memory coupled to the at least one hardware processor; and
one or more computer-readable storage media storing computer-executable instructions that, when executed, cause the computing system to perform operations comprising:
receiving a request comprising identifiers for each of a first plurality of tasks, each task of the first plurality of tasks identifying a number of element instances required for the respective task, wherein a plurality of allocation units are defined for the element, the plurality of allocation units comprising at least one aggregation unit, wherein an aggregation unit comprises a defined quantity of a plurality of element instances;
determining a total quantity of element instances comprised within the first plurality of tasks;
determining that at least a first task of the plurality of tasks and at least a second task of the plurality of tasks have a combined number of element instances that is equal to a number of element instances in a first aggregation unit defined for the element or in a multiple of the first aggregation unit;
defining a first allocation task, the first allocation task comprising (1) a first allocation subtask retrieving an instance of the first aggregation unit, or multiple instances of the first aggregation unit, and (2) a second allocation subtask distributing elements of the first aggregation unit, or of the multiple instances thereof, to the at least a first task and the at least a second task; and
defining a second allocation task directly allocating one of more instances of an allocation unit of the plurality of allocation units to at least a third task of the first plurality of tasks.

2. The computing system of claim 1, the operations further comprising:
generating computer-executable instructions to implement the first allocation task and the second allocation task.

3. The computing system of claim 1, the operations further comprising:
defining a first group comprising the total quantity of elements instances comprised within the first plurality of tasks;
determining that a combination of a second plurality of tasks of the first plurality of tasks can be exactly satisfied by a multiple of a second aggregation unit defined for the element, wherein the second aggregation unit is the first aggregation unit or is an aggregation unit having a different quantity of element instances than the first aggregation unit;
determining a third plurality of tasks comprising tasks of the first plurality of tasks that are not included in the second plurality of tasks;
dividing the second plurality of tasks and the third plurality of tasks into two different groups; and
separately analyzing the two different groups for defining allocation tasks.

4. The computing system of claim 1, wherein the determining that at least a first task of the plurality tasks and at least a second task of the plurality of tasks have a combined number of elements instances that is equal to a number of element instances in a first aggregation unit defined for the element or in a multiple of the first aggregation unit is a first determining operation, the operations further comprising:
determining, as a second determining operation, that a second aggregation unit, having a different quantity of element instances than the second aggregation unit, or a multiple thereof, does not exactly satisfy the at least a first task and the at least a second task, and wherein the first determining operation is carried out in response to the second determining operation.

5. The computing system of claim 4, wherein the first aggregation unit has a smaller number of element instances than the second aggregation unit.

6. The computing system of claim 4, wherein the third task comprises a number of element instances equal to a number of elements instances of a multiple of the first aggregation unit.

7. The computing system of claim 1, the operations further comprising:
defining a first group comprising the at least a first task, the at least a second task, and the at least a third task, wherein the defining a first allocation task and the defining a second allocation task are performed after the first group is defined.

8. The computing system of claim 1, wherein the first task comprises a number of element instances that is equal to a number of element instances in a multiple of a second aggregation unit, the second aggregation unit having a smaller quantity of element instances than the first aggregation unit.

9. The computing system of claim 8, wherein the first allocation task comprises allocation operations for a fourth task of the first plurality of tasks, wherein a number of element instances for the second task and the fourth task, and optionally additional tasks, exactly equals a multiple of the number of element instances in the first aggregation unit.

10. The computing system of claim 1, the operations further comprising:
in response to the defining the first allocation task, removing the instance or multiple instances of the first aggregation unit from a quantity of the first aggregation unit.

11. The computing system of claim 1, wherein the first allocation task and the second allocation task are a smaller number of tasks than tasks for directly allocating one or more instances of the allocation unit to the first task, the second task, and the third task.

12. A method, implemented in a computing system comprising at least one hardware processor and at least one memory coupled to the at least one hardware processor, the method comprising:
receiving a request comprising identifiers for each of a first plurality of tasks, each task of the first plurality of tasks identifying a number of element instances required for the respective task, wherein a plurality of allocation units are defined for the element, the plurality of allocation units comprising at least one aggregation unit, wherein an aggregation unit comprises a defined quantity of a plurality of element instances;
determining a total quantity of element instances comprised within the first plurality of tasks;
determining that a second plurality of tasks selected from the first plurality of tasks comprises a number of elements instances equal to a number of element instances in the first aggregation unit or a multiple of the first aggregation unit;
determining that the second plurality of tasks is less than the first plurality of tasks;
defining a third plurality of tasks that are tasks of the first plurality of tasks not included in the second plurality of tasks; and
determining whether the third plurality of tasks are satisfiable using a second aggregation unit, wherein the second aggregation unit has a number of element instances different than the first aggregation unit, or a multiple of the second aggregation unit.

13. The method of claim 12, further comprising:
separately defining allocation tasks for the second plurality of tasks and the third plurality of tasks.

14. The method of claim 12, further comprising:
for a task of the second plurality of tasks or the third plurality of tasks, determining that the task has a number of element instances equal to a number of element instances in an aggregation unit defined for the element or a multiple thereof; and
defining an allocation task directly allocating one or more instances of the aggregation unit to the task.

15. The method of claim 14, further comprising:
for a plurality of other tasks of the second plurality of tasks or the third plurality of tasks, defining an allocation task comprising (1) a first allocation subtask to retrieve one or more instances of an aggregation unit defined for the element; and (2) a second allocation subtask to distribute element instances of the one or more instances of the aggregation unit to the plurality of other tasks.

16. The method of claim 15, wherein the number of element instances in the one or more instances of the aggregation unit is equal to a number of element instances in the plurality of other tasks.

17. The method of claim 15, wherein a task of the plurality of other tasks comprises a number of element instances equal to a multiple of an aggregation unit having a smaller number of element instances than the aggregation unit.

18. The method of claim 12, further comprising:
generating computer-executable instructions to implement allocation tasks allocating element instances to the first plurality of tasks.

19. The method of claim 12, further comprising, for the second plurality of tasks:
determining that an instance of the first aggregation unit is not available;
determining that at least a portion of the tasks of the second plurality of tasks can be exactly satisfied by a multiple of a third aggregation unit, wherein the third aggregation unit has a smaller number of element instances than the first aggregation unit, and where the third aggregation unit is the second aggregation unit or is an aggregation unit other than the second aggregation unit.

20. One or more computer-readable storage media comprising:
computer-executable instructions that, when execute by a computing system comprising at least one hardware processor and at least one memory coupled to the at least one hardware processor, cause the computing system to receive a plurality of values, the plurality of values having an order;
computer-executable instructions that, when executed by the computing system, cause the computing system to define a step size;
computer-executable instructions that, when executed by the computing system, cause the computing system to define a first sum to achieve using value of the plurality of values as a first multiple of the step size;
computer-executable instructions that, when executed by the computing system, cause the computing system to set a subsum value to zero;

computer-executable instructions that, when executed by the computing system, cause the computing system to set a current value to a first value of the plurality of values;

computer-executable instructions that, when executed by the computing system, cause the computing system to generate a data structure by, for each value of the plurality of values, until the subsum value equals the first sum to achieve:
- determining whether the subsum value is equal to the current value or is produced by adding the current value to one or more of a set of zero or more prior values;
- when the subsum is equal to the current value or is produced by adding the current value to one or more of a set of zero or more prior values: (1) associating the current value with a first value indicating that the subsum is producible using the current value; and (2) associating values of the plurality of orders occurring after the current value with a second value indicating that the subsum is producible using a value of the plurality of values earlier in the order;
- adding the current value to the set of zero or more prior values;
- setting the current value to a value of the plurality of values next occurring in the order; and
- when the subsum value is less than the first sum to achieve, incrementing the subsum value by one;

computer-executable instructions that, when executed by the computing system, cause the computing system to determine multiple values of the plurality of values whose sum is the same as the first sum to achieve using the data structure;

computer-executable instructions that, when executed by the computing system, cause the computing system to define a second sum to achieve as a second multiple of the step size, wherein the second multiple is smaller than the first multiple;

computer-executable instructions that, when executed by the computing system, cause the computing system to determine whether the second sum to achieve can be achieved using values of the plurality of values using the data structure.

* * * * *